(12) United States Patent
Dautz et al.

(10) Patent No.: US 10,504,313 B2
(45) Date of Patent: Dec. 10, 2019

(54) LOCKER SYSTEM ACCESS CONTROL

(71) Applicants: Christoph Dautz, Bonn (DE); Markus von Gostomski, Bonn (DE); Birgit Lange, Bonn (DE); Nadra Mechlaoui, Bonn (DE); Cem Celikkaya, Köln (DE); Marc Bauer, Reutlingen (DE); Michal Kolodziej, Wroclaw (PL); Johannes Schröder, Köln (DE)

(72) Inventors: Christoph Dautz, Bonn (DE); Markus von Gostomski, Bonn (DE); Birgit Lange, Bonn (DE); Nadra Mechlaoui, Bonn (DE); Cem Celikkaya, Köln (DE); Marc Bauer, Reutlingen (DE); Michal Kolodziej, Wroclaw (PL); Johannes Schröder, Köln (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/995,319

(22) Filed: Jun. 1, 2018

(65) Prior Publication Data

US 2018/0350177 A1   Dec. 6, 2018

(30) Foreign Application Priority Data

Jun. 2, 2017  (EP) .................................... 17174305

(51) Int. Cl.
  *G07C 9/00* (2006.01)
  *G07F 17/12* (2006.01)
  *G06Q 20/32* (2012.01)

(52) U.S. Cl.
  CPC ....... *G07C 9/00309* (2013.01); *G06Q 20/325* (2013.01); *G06Q 20/327* (2013.01);
  (Continued)

(58) Field of Classification Search
  CPC ...... G07C 9/00309; G07C 2009/00793; G07C 9/00571; G07C 9/00111; G07C 9/00103;
  (Continued)

(56) References Cited

U.S. PATENT DOCUMENTS 6,879,243 B1* 4/2005 Booth ................... E05B 47/026
                                                             340/5.73
9,648,017 B2* 5/2017 Wenninger .......... H04L 63/0428
(Continued)

FOREIGN PATENT DOCUMENTS

WO  WO 2016/019065 A1  2/2016
WO  WO 2016/023558 A1  2/2016
(Continued)

*Primary Examiner* — Mark S Blouin
(74) *Attorney, Agent, or Firm* — Reinhart Boerner Van Deuren P.C.

(57) ABSTRACT

A method is disclosed in which a challenge from a locker system is transmitted to a mobile device. A response is received from the mobile device at the locker system, and the response was generated by a backend system, which received the challenge from the mobile device, at least based on the challenge received by the backend system and on a first key stored at the backend system and has been transmitted to the mobile device. At the locker system, it is checked whether the received response was generated under usage of at least the challenge and a key that corresponds to a second key stored at the locker system. Access is granted to a compartment of the locker system at least depending on a result of the checking. Further disclosed are methods performed by the mobile device and the backend system, and according apparatuses pertaining to these methods.

37 Claims, 10 Drawing Sheets

(52) U.S. Cl.
CPC ..... *G06Q 20/3278* (2013.01); *G07C 9/00103* (2013.01); *G07C 9/00158* (2013.01); *G07C 9/00571* (2013.01); *G07C 9/00912* (2013.01); *G07F 17/12* (2013.01); *G07C 2009/00388* (2013.01); *G07C 2009/00396* (2013.01); *G07C 2009/00769* (2013.01)

(58) Field of Classification Search
CPC ...... G07C 2209/63; G07C 2009/00865; G07C 9/00007
USPC ....................................................... 340/5.61
See application file for complete search history.

(56) References Cited

U.S. PATENT DOCUMENTS

| | | | |
|---|---|---|---|
| 2002/0099662 | A1 | 7/2002 | Joshi |
| 2011/0311052 | A1 | 12/2011 | Myers et al. |
| 2012/0222103 | A1 | 8/2012 | Bliding et al. |
| 2014/0330603 | A1* | 11/2014 | Corder ............... G06Q 10/0631 705/7.12 |
| 2015/0007619 | A1 | 1/2015 | Finney et al. |
| 2015/0254760 | A1 | 9/2015 | Pepper |
| 2016/0050191 | A1 | 2/2016 | Alt |
| 2017/0236350 | A1* | 8/2017 | Lin ................... G07C 9/00309 340/5.61 |

FOREIGN PATENT DOCUMENTS

| | | |
|---|---|---|
| WO | WO 2016/193794 A1 | 12/2016 |
| WO | WO 2017/027929 A1 | 2/2017 |

\* cited by examiner

LOCKER SYSTEM ACCESS CONTROL

CROSS-REFERENCE TO RELATED PATENT APPLICATION

This patent application claims priority to European Application No. 17174305.7, filed Jun. 2, 2017, the entire teachings and disclosure of which are incorporated herein by reference thereto.

FIELD OF THE DISCLOSURE

The present invention relates to the field of access control, and in particular relates to controlling access to compartments of a locker system.

BACKGROUND

Locker systems are known in the art. Generally, a locker system comprises a plurality of compartments. Each compartment comprises a respective door that, in an opened state, allows objects to be placed into or retrieved from an interior of the compartment. A lock associated with the door allows the door to be locked (non-openable) or unlocked (openable) and thus allows for controlling access to the compartment. The locks may in particular be operated (locked/unlocked) electronically. A processor of the locker system may for instance check a person's authorization to access a compartment, e.g. based on authorization information provided by the person to the controller, and, in case that the person is considered authorized by the processor, grant access to the compartment by issuing a control signal to unlock the lock.

BRIEF SUMMARY OF SOME EXAMPLE EMBODIMENTS OF THE INVENTION

It is generally desirable to use a mobile device (e.g. a smartphone) to wirelessly provide authorization information to a locker system. The authorization information may for instance have been generated by a backend system and is then, after provision to the mobile device, at least temporarily stored on the mobile device. To aggravate replay attacks and capture/analysis of authorization information wirelessly transmitted from the mobile device to the locker system, instead of transmitting the authorization information itself, a challenge-response approach may be applied, where the locker system transmits an (e.g. random) challenge to the mobile device, which generates (e.g. computes), based on the challenge and the authorization information, in particular according to a non-reversible function, a response and transmits the response back to the locker system. The locker system generates an expected response based on the challenge and on authorization information stored at the locker system. If the received response and the expected response match, the locker system can assume that the mobile device has the same authorization information like the locker system and may grant access a user of the mobile device access, e.g. to one or more compartments of the locker system.

While in such an approach, the authorization information is not transmitted in the clear, still the authorization information has to be accessible to the mobile device, so that the mobile device is able to compute the response. The authorization information is thus still susceptible to fraudulent use and/or analysis, for instance by the user of the mobile device and/or by malicious applications (e.g. malware) inadvertently installed on the mobile device.

It is inter alia an object of the present invention to further protect authorization information that is generated by a backend system, provided to a mobile device and used by the mobile device to get access to one or more compartments of a locker system.

According to a first exemplary aspect of the invention, a method is disclosed that comprises: transmitting a challenge from a locker system to a mobile device; receiving a response from the mobile device at the locker system; checking at the locker system whether the received response has been generated under usage of at least the challenge and a key that corresponds to a second key stored at the locker system; and granting access to a compartment of the locker system at least depending on a result of the checking. This method may for instance be performed by the locker system, or may be performed and/or controlled by an apparatus that is a part of the locker system.

According to the first exemplary aspect of the invention, the response may have been generated by a backend system, which received the challenge from the mobile device, at least based on the challenge received by the backend system and on a first key stored at the backend system and may have been transmitted to the mobile device.

According to the first exemplary aspect of the invention, the method may further comprise: transmitting the challenge received by the mobile device from the mobile device to the backend system; generating, by the backend system, a response at least based on the challenge received by the backend system and on a first key stored at the backend system; transmitting the response to the mobile device; transmitting the response received by the mobile device to the locker system. These further steps may in particular take place after the challenge is transmitted from the locker system to the mobile device and before the response is received from the mobile device at the locker system. This method may for instance be performed by a system that comprises the backend system, the mobile device and the locker system. Such a system will also be referred to as a system according to a fourth exemplary aspect of the invention below.

According to a second exemplary aspect of the invention, a method is disclosed that comprises: receiving, at a mobile device, a challenge transmitted by a locker system; transmitting the challenge received at the mobile device to a backend system; receiving, at the mobile device, a response from the backend system, wherein the response has been generated by the backend system at least based on the challenge received from the mobile device and on a first key stored at the backend system; transmitting the response received at the mobile device from the mobile device to the locker system [as at least a part of a proof of authorization for access to at least one compartment of the locker system], wherein access to a compartment of the locker system is granted by the locker system at least depending on a result of a checking whether the response received at the locker system has been generated under usage of at least the challenge and a key that corresponds to a second key stored at the locker system. This method may for instance be performed by the mobile device or may be performed and/or controlled by an apparatus that is a part of the mobile device.

According to a third exemplary aspect of the invention, a method is disclosed that comprises: receiving, at a backend system, a challenge transmitted by a mobile device; generating, at least based on the challenge received from the mobile device and on a first key stored at the backend system, a response; transmitting the response to the mobile device to enable the mobile device to transmit the response to a locker system, wherein the challenge received from the mobile device has been received by the mobile device from the locker system, and wherein access to at least one compartment of the locker system is granted by the locker system at least depending on a result of a checking whether a response transmitted to the locker system has been generated under usage of at least the challenge and a key that corresponds to a second key stored at the locker system. This method may for instance be performed by the backend system, or may be performed and/or controlled by an apparatus that is a part of the backend system.

Furthermore, the following shall be disclosed for each of the above-described three aspects of the present invention, respectively:

(1) An apparatus or system configured to perform and/or control or comprising respective means for performing and/or controlling the method according to the respective aspect of the invention.

The means of the apparatus or system can be implemented in hardware and/or software. They may comprise for instance at least one processor for executing computer program code for performing the required function, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

(2) An apparatus or system (that in particular comprise at least two apparatuses) comprising at least one processor and at least one memory including computer program code, the at least one memory and the computer program code configured to, with the at least one processor, cause an apparatus or system (e.g. the apparatus or the system) at least to perform and/or control the method according to the respective aspect of the invention.

The above-disclosed apparatuses according to the respective aspect of the invention in item (1) or (2) above may be a module or a component for a device, for example a chip. Alternatively, the disclosed apparatus according to the respective aspect of the invention may be a device, for instance a server. The disclosed apparatus according to the respective aspect of the invention may comprise only the disclosed components (e.g. means, processor, memory) or may further comprise one or more additional components.

(3) A computer program when executed by a processor causing an apparatus (e.g. a server) to perform and/or control the actions of the method according to the respective aspect of the invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM) or hard disk of a computer, or be intended for distribution of the program, like an optical disc.

(4) A tangible, non-transitory computer-readable medium storing a computer program code, the computer program code when executed by a processor causing an apparatus to perform and/or control the method according to the respective aspect of the invention.

Furthermore, according to a fourth exemplary aspect of the present invention, a system is disclosed, comprising at least an apparatus or system according to the first exemplary aspect of the invention; an apparatus or system according to the second exemplary aspect of the invention; and an apparatus or system according to the third exemplary aspect of the invention.

In the following, example details and further embodiments of all four exemplary aspects of the present invention presented above will be described, that shall be understood to be disclosed for the method, apparatuses/systems, computer program and computer-readable medium of each of these aspects, respectively.

The locker system is an apparatus that comprises a plurality of compartments. The compartments are configured, for example, to receive objects, e.g. consignments (for example letters, parcels, small packages, spare parts, food, etc.). The compartments are each closable, for example by means of a respective door or flap. For example, the compartments are substantially cuboidal receiving containers which are provided with doors or flaps on one or more sides. For example, a plurality of compartments are arranged above one another and/or beside one another in the locker system. For example, the locker system may consist of one or more modules arranged beside one another, wherein one or more compartments are arranged above one another in each module. The respective doors of the compartments are then hinged at the side, for example, and can be opened to the front, for example. The compartments of the locker system may all have the same size. Alternatively, at least some compartments of the locker system may have different sizes. The sizes may be adapted, for example, to conventional different consignment sizes (for example parcel sizes). The locker system may for instance be battery-operated only, i.e. without being connected to a power supply network.

Each of the compartments is for instance provided with a respective lock. The lock of a compartment can be arranged, for example, in or on the compartment, for example on a door or flap of the compartment. If the lock is not arranged on the door or flap (that is to say on a side wall of the compartment, for example), it interacts with the door or flap, for example, by virtue of a bolt, for example, being inserted into an opening in the door or flap and being pulled out again. Alternatively, a hook fitted to the door or flap, for example, can be insertable into an opening in the lock in order to be locked/unlocked there. If the lock is fitted to the door or flap, for example, it can interact, for example, with the walls of the compartment, for example by inserting/pulling out bolts in openings in the walls or by receiving a hook fitted to the walls in the lock and by accordingly locking/unlocking it.

A compartment of the compartment system may be either open or closed. In the open state of the compartment, the lock of the compartment is unlocked. The door or flap of the compartment can then be opened by a person without the use of force, for example, or is open. In contrast, in the closed state of the compartment, the lock of the compartment is locked. The door or flap of the compartment can then no longer be opened by a person, who does not have the electronic key for opening, without the use of force, for example.

The lock of a respective compartment is controllable, in particular in electronic form. An according control signal or driving voltage to unlock the lock may for instance stem from a central control unit of the locker system, or from a control unit that is at least responsible of a plurality of compartments of the locker system (e.g. those of one module out of several modules of the locker system), or from a control unit that is dedicated to a single lock, respectively. The checking whether access can be granted to a compartment may for instance be performed by the central control unit, by the control unit of a module or the control units dedicated to a single lock. In a preferred embodiments of the invention, a central control unit is deployed, which checks (in particular based on the response to a challenge) whether access to one or more compartments can be granted and issues an according driving voltage to the one or more locks of these one or more compartments to unlock these one or more locks and thus grant access to these one or more compartments. Locking of the compartments may then for instance, due to an according configuration of the locks, be accomplished by closing the door or flap of a compartment, without requiring a dedicated locking signal or locking driving voltage.

The locker system is in particular configured to wirelessly communicate with the mobile device, for instance via Bluetooth (in particular according to the Bluetooth Low Energy (LE) profile) and/or via Near-Field Communication (NFC) and or via a Wireless Local Area Network (WLAN), to name but a few examples.

The locker system may in particular be an offline-system that is not connected to and/or never in direct communication with the backend system. The locker system may in particular only communicate with the backend system via the mobile device as an intermediary. The locker system may be remote from the backend system, e.g. at least more than 50 m, 100 m, 500 m, 1 km, 2 km or 5 km away from the backend system. In contrast, the mobile device, when in communication with the locker system, may not be more than 100 m, 50 m or 10 m away from the locker system.

The backend system may be embodied as a server or server cloud. It serves as backend (e.g. management entity) for a group of one or more locker systems that includes the locker system. The locker systems and the backend system may for instance be operated by a service provider, e.g. by a delivery company. The locker systems may for instance be used for delivery and/or retrieval of consignments (e.g. parcels or other shipments such as food, laundry, etc.) to consumers. To this end, the locker system may for instance be installed in public places where they are easily reachable by consumers, and/or in or in front of buildings (e.g. apartment houses) where consumers live. The backend system is in particular configured to communicate with the mobile device, for instance via an at least partially wireless communication link. For instance, the backend system is connected to a gateway to a cellular radio communication system. The backend system may, for instance upon respective requests including respective challenges, provide respective responses to a plurality of respective mobile devices for provision to a plurality of respective locker systems.

The mobile device may for instance be a portable electronic device, such as for instance a mobile phone (e.g. a smartphone), a Personal Digital Assistant (PDA), a tablet computer, a laptop computer or a wearable device (like e.g. a smart watch). In preferred embodiments of the invention, the mobile device is either a device of a delivery person (in particular a hand-held device that is capable of optically and/or wirelessly acquiring information from consignments e.g. parcels) or a mobile device (in particular a smartphone) of a consumer. The mobile device in particular is configured to communicate with the locker system and with the backend system, for instance at least partially according to different wireless transmission technologies (e.g. Bluetooth/NFC and cellular radio communication, respectively).

A challenge is transmitted from the locker system to the mobile device. The challenge may for instance have been generated by the locker system, for instance upon a request for access to one or more compartments of the locker system received from the mobile device. The challenge may comprise or be based on time-dependent and/or (pseudo-) random information. For (e.g. any) two subsequent access grants for the same compartment, the challenge may for instance differ. The challenge may for instance be time-limited (e.g. may comprise of be associated with a limited validity period). The challenge may for instance comprise respective identifiers for one or more compartments to which access is desired and/or requested.

The challenge is received by the mobile device and transmitted to the backend system, for instance as part of a request for a response. The processing of the request by the backend system may for instance require a successful authentication of the mobile device and/or its user vis-à-vis the backend system, which may for instance be proven by the mobile device with security token issued by the backend system to the mobile device in case of successful authentication.

The backend system generates (e.g. computes) a response at least based on the challenge and on a first key stored at the backend system. The first key may for instance be unique for the locker system, for a compartment thereof or may be associated with a single use of the compartment only. The response may for instance be generated by means of a non-reversible cryptographic function. For instance, the response may be computed as a Message Authentication Value (MAC), in particular a Keyed-Hash MAC (HMAC), e.g. according to RFC 2104 (for instance based on SHA-512), with the challenge as message and the first key as the secret key. Equally well, the response may be computed by encrypting the challenge with the first key.

The response is transmitted from the backend system to the mobile device, and then from the mobile device to the locker system.

The locker system then checks whether the received response has been generated under usage of at least the challenge (as transmitted by the locker system to the mobile device) and a key that corresponds to a second key stored at the locker system. Access to the compartment is then granted at least depending on a result of the checking. In particular, it is a necessary condition for granting of access to the compartment (e.g. among one or more further conditions) that the checking revealed that the received response has been generated under usage of at least the challenge and a key that corresponds to the second key stored at the locker system. As described above, access may for instance be granted by issuing a control signal or driving voltage to a lock of the compartment to cause unlocking of the compartment.

A key is for instance considered to correspond to the second key stored at the locker system if the key and the second key are identical, or if the key and the second key form an asymmetric key pair (e.g. a pair comprising a public key and a private key), e.g. according to the RSA method (Rivest, Shamir, Adleman).

In the methods according to the first, second and third aspects of the invention described above, the key used for generation of the response at the backend system is the first key. This first key either equals the second key, or forms an asymmetric key pair with the second key. In the former case, the response is for instance generated as an HMAC over the challenge with the first key as secret key. At the locker system, checking for instance comprises computing an expected response by applying the same operations as those at the backend system at the locker system, i.e. by computing an HMAC over the challenge with the second key as secret key, and checking if the received response equals the expected response. If this is the case, the locker system can assume that the response was generated based on a key (the first key) that corresponds to (equals) the second key stored at the locker system. A mobile device presenting such a response to the locker system is then considered to be authorized for access to the compartment of the locker system. Alternatively, if the first key and second key form an asymmetric key pair, the response may be generated at the backend system by encrypting the challenge with the first key (e.g. a public key). At the locker system, the checking may then for instance comprise decrypting the received response with the second key (e.g. a private key), and comparing the result with the challenge. If the decrypted response equals the challenge, the locker system may assume that the response was generated based on a key (the first key) that corresponds to (forms an asymmetric key pair with) the second key stored at the locker system. Again, a mobile device presenting such a response to the locker system is then considered to be authorized for access to the compartment of the locker system.

According to example embodiment of the present invention, the response to the challenge issued by the locker system is thus computed by the backend system. The mobile device relays the challenge from the locker system to the backend system and the response form the backend system to the locker system. In this way, access of the mobile device to the first key (required to compute the response to the challenge) is no longer required, and this key can be safely kept in the backend system, where it is less susceptible to attacks. This approach according to example embodiments of the present invention further allows to encrypt the response on its path from the backend system to the locker system, i.e. also on the sub-path from the mobile device to the locker system, to further aggravate replay attacks based on eavesdropping on the link between mobile device and locker system. This encryption can be based on keys that are only known to the backend system and the locker system, whereas in scenarios where the response is computed by the mobile device, this encryption has to take place at the mobile device requiring access of the mobile device to the encryption key, making this encryption key much more susceptible to retrieval/theft as compared to a scenario where this key can be kept in the backend system.

According to an example embodiment of all aspects of the present invention, the challenge is (e.g. generated and) transmitted in response to a request received at the locker system from the mobile device, and the request contains an identifier of the compartment. The challenge may then for instance be generated at the locker system for controlling access to the identified compartment.

Therein, the compartment may for instance have been determined by the backend system (e.g. from a larger group of compartments of the locker system), and the identifier of the compartment may have been transmitted from the backend system to the mobile device. The compartment may for instance have been determined by the backend system at least based on respective status information of at least the compartment maintained at the backend and/or based on information provided by the mobile device to the backend and associated with an object stored in the compartment. The former case may for instance occur if a person desires to place an object (e.g. a consignment) into a compartment of the locker system. The backend system may then determine, based on stored respective status information of some or all compartments of the locker system, which compartments are empty, and may select one of these empty compartments. Alternatively, the compartment may be determined based on information provided by the mobile device and associated with an object stored in the compartment. The information may for instance be an identifier of the object. Via a look-up table, then the compartment storing the object may be identified at the backend system, and an according identifier of the compartment may be returned to the mobile device. The information may for instance have been provided by the mobile device to the backend system as part of an authentication of a user of the mobile device vis-à-vis the backend system (e.g. in an authentication request that may for instance further comprise a password or PIN).

According to an example embodiment of all aspects of the present invention, the second key is unique for the locker system (but for instance associated with some or all compartments of the locker system). The second key may in particular be unique among (in particular different from any) respective second keys of a plurality of further locker systems that are, like the locker system, associated with (e.g. controlled by) the backend system. Such a second key may for instance be used for checking an authorization of a person (e.g. a delivery person) that wants to place one or more objects into one or more compartments of the locker system as well as for decrypting information (such as e.g. the response to the challenge) provided by the backend in encrypted form.

According to an example embodiment of all aspects of the present invention, the second key is unique for the compartment of the locker system (e.g. unique among—in particular different from any—respective second keys of a plurality of further compartments of the locker system and for instance also unique among—in particular different from any—respective second keys of respective compartments of a plurality of locker systems that are, like the locker system, associated with the backend system].

According to an example embodiment of all aspects of the present invention, the second key is associated with (e.g. valid for) a single use of the compartment only. The second key may thus be a one-time key, which is in particular not associated with another previous or later use of the compartment or of any other compartment of the locker system. Such a second key may for instance be generated or selected by the backend system and transmitted (in particular via the mobile device) towards the locker system for storage in the locker system. A successful (e.g. challenge-response) authentication procedure (e.g. based on a key of the locker system, in particular a key that is unique for the locker system among respective second keys of a plurality of locker systems associated with the backend system, as discussed in the previous paragraph) may for instance be a necessary condition for (e.g. provision and) storage of the second key in the locker system. The second key may for instance be generated or selected at the backend system in response to information received at the backend system from the mobile device that the compartment is in use (e.g. has been successfully accessed and closed and/or contains an object).

According to an example embodiment of all aspects of the present invention, which will also be referred to as the "two-process" example embodiment in the following, the method is performed at least twice, first as a first process and then again as a second process, wherein in the first process, the second key is unique for the locker system (and e.g. associated with some or all compartments of the locker system) and the mobile device is a mobile device of a first person, and wherein in the second process, the second key is unique for the compartment (at least among respective second keys of the other compartments of the locker system) or associated with a single use of the compartment only, and the mobile device is a mobile device of a second person, wherein in both the first process and the second process, access to the same compartment is granted (although the second keys used in the first process and second process are different, respectively).

Therein, in the first process, the first person is granted access to the compartment, and in the second process, the second person is granted access to the compartment. The first person may for instance be a delivery person that delivers/picks-up one or more respective consignments of one or more consumers of the locker system. The second person may for instance be a consumer of the locker system.

In the "two-process" example embodiment, the second key used in the second process for checking may be generated or selected by the backend system and transferred from the backend system to the locker system via the mobile device of the first person (in particular after the first person has been granted access to the compartment).

In the "two-process" example embodiment, in the first process and the second process, the challenge and/or the response may be exchanged between the backend system and the locker system via the mobile device in encrypted form based on a third key stored at the backend system and a fourth key stored at the locker system. The third key and/or the fourth key may for instance be unique for the locker system among a plurality of respective second keys of locker systems associated with the backend system). The mobile device may for instance not have access to the third key and the fourth key and may thus not be able to decrypt the encrypted challenge and the encrypted response.

The third key may for instance be the first key used in the first process, and the fourth key may for instance be the second key used in the first process.

According to an example embodiment of all aspects of the present invention, the transmission of the challenge and the response between the locker system and the mobile device is at least partially based on a first wireless transmission technique (e.g. Bluetooth (BT), Bluetooth Low Energy (BLE), Near Field Communication (NFC) or Wireless Local Area Network (WLAN), to name but a few examples) and the transmission of the challenge and the response between the backend system is at least partially based on a second wireless transmission technique that is different from the first wireless transmission technique (e.g. cellular mobile radio communication, for instance according to the Global System for Mobile Communication (GSM), Universal Mobile Telecommunications System (UMTS), Long Term Evolution (LTE), LTE-Advanced or 5G system, to name but a few examples). The first wireless transmission technique may for instance be a short-range wireless transmission technique (e.g. optimized for a range of up to 10 m), which advantageously has low power consumption and thus allows that the locker system can be battery-operated. If the second wireless transmission technique is a cellular mobile radio communication technique, advantageously comparably large distances between mobile device and backend system can be realized, and comparably good radio coverage can be assumed in substantially all relevant areas where the locker system may be deployed, these areas being areas where a lot of potential consumers are likely to live close-by.

Therein, information pertaining to the locker system may for instance be broadcast by the locker system, for instance by a beacon (e.g. an iBeacon) connected to the locker system, and the mobile device may receive the information and use the information to (e.g. automatically) set up communication with the locker system according to the first wireless transmission technique. For instance, the broadcast information may be—e.g. via one or more look-up tables— linked to an address of the locker system (or to further information relevant for setting up a communication with the locker system, e.g. a communication key or certificate), e.g. an address that identifies the locker system and can be used to set up a communication with the locker system. The look-up table may for instance be stored in the mobile device or can be queried by the mobile device, for instance from a server (e.g. a server of the backend system) that stores the look-up table(s). Alternatively, the address of the locker system itself may be broadcast. The address may for instance be a Medium Access Control (MAC) address of the locker system that may be used to speed up establishment of a BT or BLE connection between the mobile device and the locker system, since then no time-consuming Bluetooth pairing process may be necessary.

According to an example embodiment of all aspects of the present invention, successful authentication of a user of the mobile device vis-à-vis the backend system is a necessary condition for reception of the response from the backend system. From a security perspective, it is desirable to provide the response, which can be used for getting access to the compartment at the locker system, only to a mobile device that has properly authenticated itself vis-à-vis the backend system. Successful authentication of the mobile device vis-à-vis the backend system may for instance lead to issuance of a security token by the backend system to the mobile device. The security token may then have to be presented to the backend system by the mobile device when communicating with and/or requesting information (in particular the response) from the backend system.

Therein, when this example embodiment is combined with the "two-process" example embodiment described above, in the first process, the user of the mobile device may be the first person, and the authentication of the first person may be based on security information associated with the first person and/or with the mobile device of the first person. The security information may for instance be a password, a combination of a login and a password, or a certificate, to name but a few non-limiting examples. The security information may for instance be associated with the first person and/or with the mobile device of the first person for a pre-defined time period (e.g. a month, half a year or a year, to name but a few examples). The security information may for instance be assigned to the first person and/or to the mobile device of the first person by the backend system, for instance in a registration process. The security information may for instance be independent of the compartment to which access shall be granted and/or independent of an object stored or to-be-stored in the compartment to which access shall be granted.

Furthermore (or alternatively), in the second process, the user of the mobile device may be the second person, and the authentication of the second person vis-à-vis the backend system may be based on at least a first information associated with the compartment and/or with an object stored in the compartment and a second information.

The first information may for instance be the same information based on which the backend system identifies the compartment, as described above.

The first information (or information associated with the first information, e.g. information based on which the first information can be computed or which is uniquely linked to the first information) and the second information may for instance be provided to the mobile device of the second person and/or to the second person via respectively different provision channels. For instance, the first information (or the information associated with the first information) may be communicated to the mobile device of the second person or to the second person in a manner that differs from a manner in which the second information is communicated to the mobile device of the second person or to the second person. For instance, messaging technologies used may differ, for instance the first information (or the information associated with the first information) may be provided via an e-mail message, whereas the second information may be provided via an SMS, MMS or whatsapp message. For provision of the first information (or the information associated with the first information) and the second information to the mobile device of the second user, advantageously no specific registration of the mobile device and/or the second person at the backend system is necessary. It is for instance sufficient if a phone number and an email address of the second user is known to the backend system to enable the backend system to send the first information (e.g. in an e-mail) and the second information (e.g. in an SMS message) to the mobile device of the second user.

Alternatively, the first information (or information associated with the first information) and the second information may for instance be provided to the mobile device of the second person and/or to the second person via the same provision channel, and wherein the provision channel is making a notification card bearing the first information (or the information associated with the first information) and the second information on it physically available to the second person (e.g. by leaving it in a letter box or at or in the premises of the second person). For instance, the notification card may have the first information (or the information associated with the first information) printed thereon, and the second information may be written or printed by the first person or by the mobile device of the first person onto the notification card after the mobile device of the first person has received the second information from the backend system. Using different provision channels for the first information (or the information associated with the first information) and second information may be dispensable if the first information (or the information associated with the first information) and second information are printed/written on a notification card that is physically made available to the second person, e.g. left in his/her letter box or at or in his/her premises.

For instance, the second person may be authenticated via-a-vis the backend system if a combination of the first information (e.g. an object number or consignment number, e.g. provided in an email to the mobile device of the second person) and the second information (e.g. a PIN, e.g. provided to the mobile device of the second person in an SMS, MMS or whatsapp message), matches corresponding information stored at the backend system. Therein, the first information (or information associated with the first information) and the second information are for instance provided by the second person via the mobile device of the second person to the backend.

According to an example embodiment of all aspects of the present invention, the challenge comprises an identifier of the compartment to which access is desired. The challenge-response procedure may then for instance be performed for the compartment identified by the identifier, and for instance no temporally parallel further respective challenge-response procedures may be allowed.

According to an example embodiment of all aspects of the present invention, access is jointly granted to a plurality of compartments based on a single challenge and a single response. Such a challenge-response procedure may for instance be used by the first person to retrieve overdue (and non-collected) objects or rerouted objects from the locker system.

Therein, the single challenge may for instance comprise respective identifiers of the plurality of compartments to which access is desired. This is advantageous since less messages have to be transmitted as compared to a scenario with respective challenges and responses for each compartment.

Additionally or alternatively, the plurality of compartments may have been identified by the backend system at least based on respective status information of the compartments (e.g. if a compartment has been occupied for a time that exceeds a pre-defined threshold) and/or based on respective information on one or more objects respectively stored in one or more of the compartments (e.g. information that the one or more objects shall be rerouted and thus need to be retrieved from the locker system).

According to an example embodiment of all aspects of the present invention, the checking may comprise: generating, at the locker system and at least based on the challenge and the second key stored at the locker system, an expected response; and checking whether the received response matches the expected response. Instead of computing an expected response and comparing it with the received response, an encrypted challenge may be received as response, decrypted and compared to the challenge, as already explained above.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

In the following, a more detailed description of example embodiments of the present invention will be provided. Therein, the locker system is exemplarily considered to be a parcel locker, in which a courier deposits parcels (or other objects) that are destined for (e.g. addressed to) respective consumers, which may for instance be natural persons, but may equally well be legal entities like companies. The parcel locker is for instance located at a place that can conveniently reached by the consumers. By depositing a parcel in the parcel locker, delivery of the parcel is accomplished without a need for the consumer being present at the time of delivery. An example for such a parcel locker is the "Packstation" of the applicant. It is to be noted that the details provided in the following description shall not be understood to be mandatory for the present invention. In particular, the communication techniques (such as Bluetooth, or http(s) over a cellular mobile radio network) and the cryptographic techniques (such as AES and HMAC) are only to be understood as examples. Furthermore, of course not all method steps shown in the flowcharts shall be understood to be necessary or essential, and the flowcharts that show the interplay of the method according the first, second and third method of the present invention shall also be understood as a source of disclosure for each single of these methods, without necessarily requiring the disclosed steps of the respective two other methods. Furthermore, encryption of information exchanged between the entities of the system shall also be considered an optional measure to further enhance security.

Figure 1:
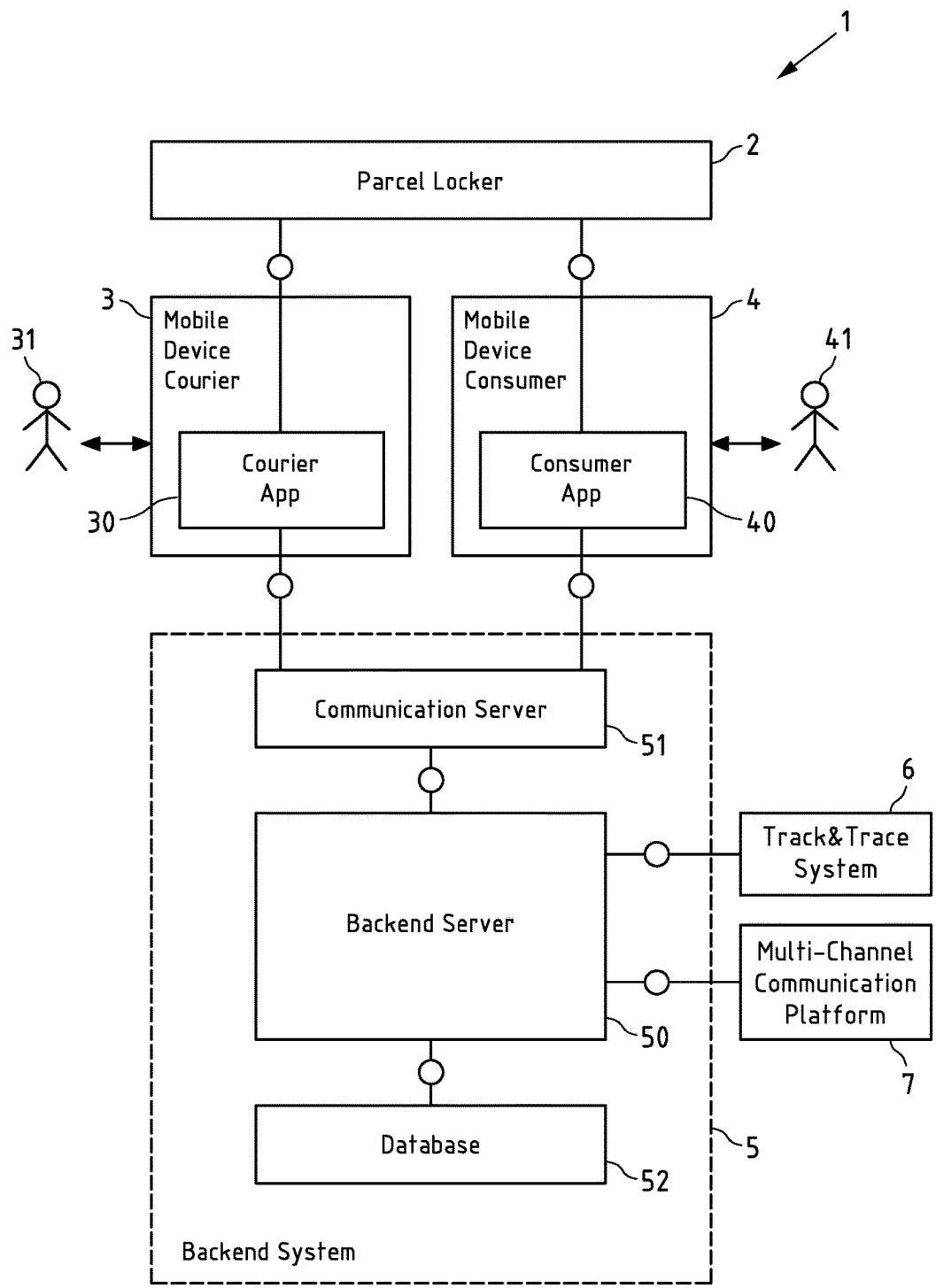
FIG. 1 shows a schematic block diagram of a system according to an exemplary embodiment of the invention.

FIG. 1 is a schematic block diagram of a system 1 according to the present invention, which may be understood as a parcel locker management and control system. System 1 comprises a physical parcel locker 2 (hardware), where parcels can be deposited and picked up from individual, locked compartments, apps 30 and 40 that enable couriers 31 and consumers 41 to deliver parcels to the parcel locker 2 and pick up delivered parcels from the parcel locker 2, respectively, and a backend system 5 that supports administrative tasks and is responsible for the overall control of the system 1. In system 1, only one parcel locker 2 is exemplarily shown, but it is readily understood that system 1 is capable of comprising and controlling a plurality of parcel lockers 2. Therein, courier app 30 is installed on mobile device 3 of courier 31, which mobile device 3 may for instance be embodied as a hand-held optical scanning device with wireless communication capabilities. Consumer app 40 is installed on mobile device 4 of consumer 41, which mobile device 4 is for instance a smartphone. Communication between mobile devices 3 and 4 and the parcel locker 2 may for instance be based on Bluetooth, but equally well, other communication techniques such as NFC or WLAN may be possible here. Backend system 5 comprises a communication server 51 that allows for communication with the apps 30 and 40, for instance based on the Hypertext Transfer Protocol (HTTP) secured by Transport Layer Security (TLS) or Secure Sockets Layer (SSL), also referred to as HTTPS. This communication may at least partially be based on a wireless communication technique, in particular based on cellular mobile radio communication. Backend system 5 further comprises a backend server 50 that implements the core functionality of backend system 5, i.e. inter alia controls access and occupancy of the parcel locker 2. In particular, backend server 50 computes responses to challenges and performs encryption of information, if necessary. Backend server 50 interfaces with communication server 51 (e.g. based on HTTP), and further interfaces with a database 52, where data relevant for the operation of system 1 is stored, such as for instance information on parcel locker 2 and its compartments (e.g. on their occupancy). Database 52 may however also be integrated into backend server 50. Furthermore, backend server 50 has an interface (e.g. via HTTP or HTTPS) towards a track & trace system 6, where parcel information may be stored. This system 6 may for instance be queried to obtain consumer information, such as for instance a mobile phone number and/or email address of a consumer. Backend server 50 further has an interface (e.g. via HTTP or HTTPS) towards a multi-channel communication platform 7, via which messages (e.g. email, SMS, MMS or whatsapp messages, to name but a few examples) can be sent to consumers. Components 6 and/or 7 may equally well be included in backend system 5 instead of being external therefrom.

In the example system 1 of FIG. 1, parcel locker 2 constitutes an example of an apparatus according to the first aspect of the present invention, mobile devices 3 and 4 constitute examples of apparatuses according to the second aspect of the invention, and backend system 5 constitutes an example of a system according to the third aspect of the present invention. System 1 itself constitutes an example of a system according to the fourth aspect of the present invention. Furthermore, courier app 30 and consumer app 40 constitute respective examples of a computer program according to the second aspect of the present invention.

In example embodiments of the present invention, parcel locker 2 is "lean" in the sense that it offers only basic functions like "open compartment" or "close compartment" and does not do complex validations or computations on its own. It may not need an Internet connection (i.e. is "offline") or a complex user interface. In particular, all interaction with the parcel locker 2 may advantageously be performed via mobile apps 30 and 40 which in turn interact with the backend system 5. As a result, the costs for building and maintaining the physical parcel lockers 2 are low and the whole system 1 is easy to enhance and adapt to changing requirements. In addition, the app-based user interface for the parcel locker 2 is a unique feature that follows the consumer's habits to use smartphones for everything, including managing their parcel delivery.

In example embodiments of the present invention, the design of system 1 is based on the following decisions:

Couriers 31 and consumers 41 will need to have a smartphone 3, 4 with active Internet and Bluetooth connection to be able to deliver or pick up parcels.

The smartphones 3 used by couriers will be provided by the courier's logistics company.

Courier apps 30 and consumer apps 40 will connect to the physical parcel locker 2 via Bluetooth Low Energy.

The physical parcel locker 2 does not need Internet connection; the apps 30, 40 are used as a "mediator" if communication between physical parcel locker 2 and backend system 5 is necessary.

The physical parcel locker 2 is not equipped with any control panel.

There is no need for a courier or consumer signature to document the fact that a parcel has been delivered to or picked up from the parcel locker 2. The "compartment closed" event is sufficient to document delivery and pick up, respectively.

To make it easy for consumers 41 to use the parcel locker 2, there shouldn't be any explicit consumer registration to the system 1. The information that is necessary to communicate with the consumer 41 within the delivery process (e.g. mail address for consumer notification) should be extracted from the shipment information.

For security reasons, neither the physical parcel locker 2 nor the apps 30, 40 should store sensitive information.

In the following, the main use cases of example embodiments of the present invention are described in more detail, in particular A) parcel delivery by courier 31, B) parcel pick-up by courier 31 and C) parcel pick-up by consumer 41.

A) Parcel Delivery by Courier

One of the main processes within the parcel locker solution is the delivery process.

System 1 has to support two different variants of the delivery process:

In the first variant, the consumer 41 actively routes the parcel to a parcel locker 2, by specifying the parcel locker address as delivery address during the ordering process ("direct delivery" scenario). In the second variant, the courier 31 decides to deliver a parcel to a parcel locker 2 because he was not able to deliver the parcel personally due to absence of the consumer 41 ("consumer not@home" scenario).

The concrete processes differ slightly. In the first variant, the consumer 41 will usually be informed via email/SMS that the parcel is awaiting pick up in the parcel locker 2.

In the second variant, to inform the consumer 41 about the delivery, the courier 31 will leave a printed notification card with all necessary information for the consumer 41, e.g. in the consumer's letter box. Both use cases are described separately below.

Variant 1: Direct Delivery Scenario

The use case starts when the courier 31 has to deliver a parcel that is addressed to a parcel locker 2. The process is visualized in the flowchart 200 of FIG. 2a and FIG. 2b. Flowchart 200 shows the "happy day" scenario, where the process goes smoothly. Exception handling is described further below. Example embodiments of the method according to the first, second and third aspect of the present invention may for instance be performed in the use case described by the flowchart 200 of FIG. 2a and FIG. 2b (in particular with respect to its steps 210 and 211), as will become apparent from the description of the flowchart 400 of FIG. 4a and FIG. 4b below.

In front of the parcel locker 2, courier 31 starts (201) the courier app 30 and identifies himself (202) vis-à-vis the backend system 5. After successful authentication, the app 30 will automatically connect to the parcel locker 2 via Bluetooth (203).

The courier 31 starts the delivery process and scans the bar code of the first parcel (204) and enters the size of the parcel he wants to deliver (205). The scanned parcel number is then sent to the backend system 5 (206). Alternatively, the parcel number may be captured from the parcel via RFID or NFC (e.g. from a tag), to name but a few examples.

The backend system 5 requests available shipment information from track & trace system 6 and extracts mail address and phone number of the consumer 41 (207, 208).

The backend system 5 decides to which compartment of the parcel locker 2 the parcel should be delivered, based on status information stored in the backend system 5 (209). The result (compartmentId) is sent back to courier app 30 and courier app 30 requests the parcel locker 2 to open the compartment (210).

The courier 31 deposits the parcel into the compartment opened by the parcel locker (211) and closes the door (212, 213). The parcel locker 2 sends a confirmation that the compartment has been closed to the courier app 30 (214).

After the courier 31 acknowledged the successful delivery on the courier app 30 (215), the status of the compartment is updated within the backend system 5 (status "taken", parcel number, email address and mobile number of consumer 41, delivery date), as per steps 216-218.

Backend notifies track & trace system 6 about parcel delivery to parcel locker 2 (219, 220).

In addition, the parcel locker backend system 5 will inform the consumer 41 on the delivery as follows. The backend system 5 sends an email to the consumer 41 (by using multi-channel communication platform 7) to inform the consumer 41 about the delivery (221, 222). This email contains a personalized link to start the Consumer Mobile App 40. In addition, the backend system 5 will generate a PIN (or another secure information) that will enable the consumer 41 to open the compartment that holds his parcel and send an SMS containing this PIN to the consumer 41 (by using multi-channel communication platform 7). The separate submission of delivery email and SMS is done for security reasons, since both provision channels would have to be breached by an attacker to be able to collect the parcel.

The courier 31 may then proceed to deliver additional parcels.

The following exceptions from this "happy day" process are conceivable:

If no suitable compartment is available, a delivery to the parcel locker 2 is not possible. The consumer 41 will for instance be informed about the unsuccessful delivery attempt.

If a compartment gets closed by accident before the parcel has been deposited, the courier 31 may open the compartment again. The courier app 30 may for instance show a dialog with an option "reopen compartment" when the doors of the compartment gets closed.

It may be important, that the compartment doors get closed before continuing. To force the courier 31 to close the compartment doors, the courier app 30 may suspend and await the message from physical parcel locker 2 that the compartment has been closed (214). As soon as the message arrives, the courier app 30 allows the courier 31 to acknowledge the delivery.

If the consumer 41 explicitly refuses to pick up parcels from a parcel locker 2, the consumer 41 may be added to a "blacklist" (e.g. by a customer service team). In the blacklist, email address and mobile number of the consumer may be listed. After retrieving the shipment information from the track & trace system 6, backend system 5 checks if the consumer 41 is listed there. If so, the delivery to the parcel locker 2 is not allowed and a corresponding error message is shown in the courier app 30.

If email address and/or mobile number of the consumer 41 are not available, the courier 31 is asked whether the courier 31 wants to inform the consumer 41 via a (physical) notification card instead of sending information electronically. In this case, the delivery is possible (see Scenario 2 further described below: Consumer not@home). Otherwise, the delivery to parcel locker 2 ends and the standard delivery process has to be followed (e.g. deliver parcel to a parcel shop and inform consumer 41).

Variant 2: Consumer Not@Home Scenario

The use case starts when the courier 31 could not deliver a parcel to the consumer 41 and decides to deliver the parcel to a parcel locker 2 instead. The related "happy day" process may then take the following shape.

The first steps 201-216 of the process are the same as described before with reference to FIG. 2a and FIG. 2b: The courier 31 has to be authorized, scans the parcel and deposits the parcel to the parcel locker 2. Also steps 217-220 may then also take place as described with reference to FIG. 2a and FIG. 2b above, while steps 221-224 of FIG. 2a and FIG. 2b would be modified as described below.

After acknowledgement of delivery (216), the courier 31 has to fill in a notification card. The courier 31 first scans the (unique) barcode (e.g. a 1D or 2D barcode) that is shown on the pre-printed notification cards with his mobile device 3. This barcode (or information extracted therefrom) is sent to the backend system 5 (this may, alternatively, be performed as part of step 216) which will generate a PIN (or similar secure information) that will enable the consumer 41 user to open the compartment during pick up via the consumer app 40. The generated PIN will be shown in the courier app 30. The courier 31 has to note down the PIN manually on the notification card (or use his mobile device 3 or a peripheral device thereof to print the PIN on the notification card) and submit the notification card to the consumer 41 (e.g. by putting it into the letterbox of consumer 41).

Exceptions from this "happy day" process would be handled as described for the variant 1 (direct delivery scenario) above.

B) Parcel Pick-Up by Courier

If the consumer 41 did not pick up a parcel from the parcel locker 2 within a given time period (e.g. 7 days), the courier 31 has to take the parcel from the parcel locker 2 and return it to the sender.

Furthermore, it is possible that a consumer 41 is not able to open the parcel locker 2 (e.g. because he or she does not have a smartphone). In this case, the consumer 41 may contact the parcel locker hotline and request that the parcel is delivered otherwise (e.g. to a parcel shop).

Consequently, the courier 31 must be able to check on parcels he needs to pick up from the parcel locker 2 and open the corresponding compartments. The process is similar to the delivery process:

In front of the parcel locker 2, courier 31 starts the courier app 30 and identifies himself. After successful authorization, the app will automatically connect to the parcel locker via Bluetooth.

The courier 31 selects the "pick up parcel" option from the app 30.

The backend system 5 will check the status of all compartments of the parcel locker 2 the courier app 30 is currently connected to and will identify all overdue parcels (e.g. those having delivery date+Pick-Up-Timeframe>CurrentDate) and/or all parcels that have been rerouted by the consumer.

The backend system 5 will send a list of all compartments to the courier app 30 that contain parcels that have to be picked up.

The courier app 30 will forward this list to the parcel locker 2 and request to open all compartments on the list.

The courier 31 can now withdraw the parcels and close the compartment doors.

When the parcel locker 2 confirms the closing of a compartment door to the app 30, the app 30 forwards this information to the backend system 5, which updates the compartment status accordingly.

As an option, the courier 31 may be required to scan all withdrawn parcels to confirm the pick-up and to identify the state of the parcels ("overdue" or "rerouted").

C) Parcel Pick-Up by Consumer

After a consumer 41 has been informed that his parcel has been delivered to a parcel locker 2, either by an email (scenario 1) or by a notification card (scenario 2), the consumer 41 may pick up the parcel from the parcel locker 2.

Figure 3A:
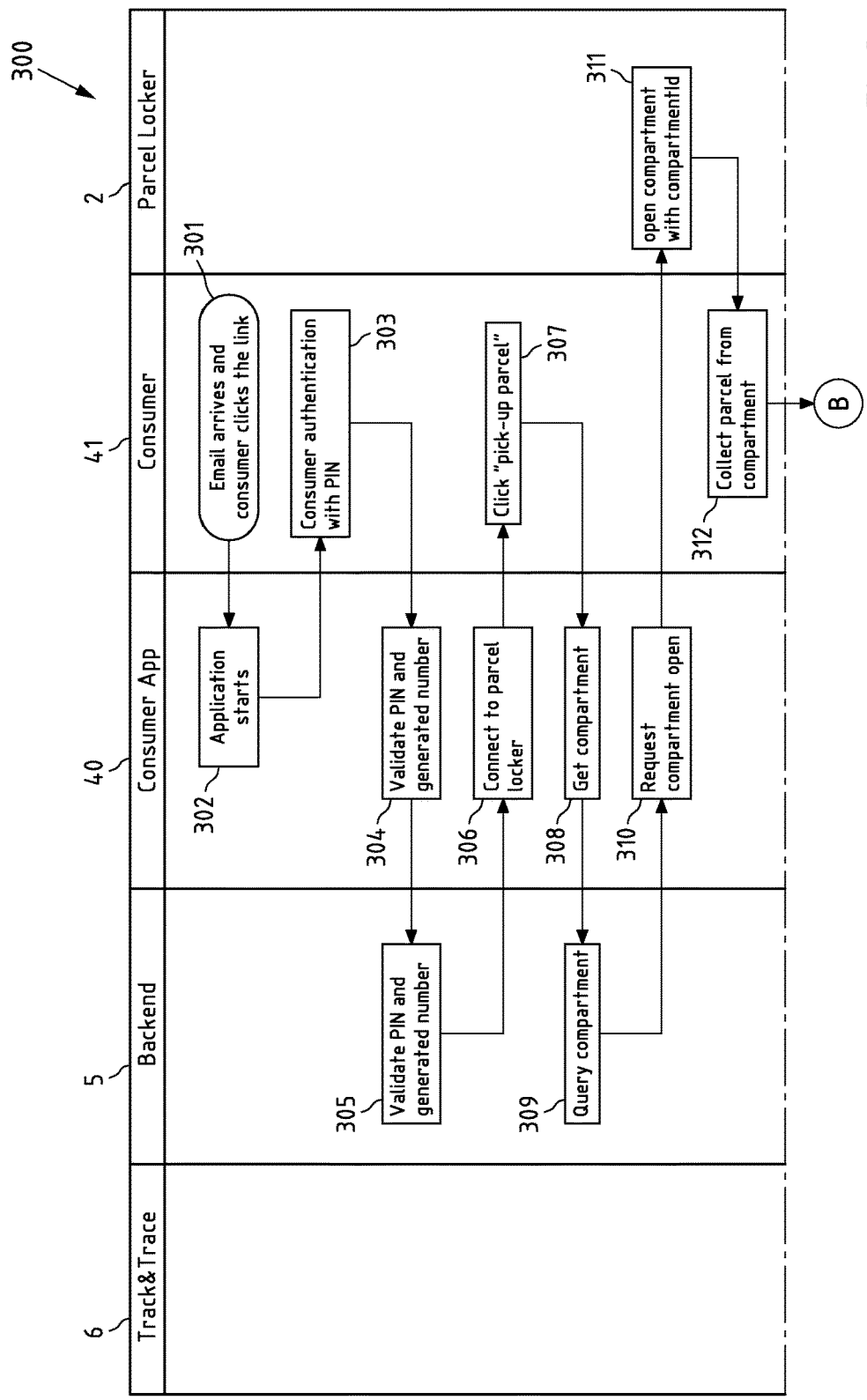
FIG. 3a and FIG. 3b provide a flowchart showing a use case of parcel pick-up by a consumer from a parcel locker, in the context of which example embodiments of the method according to the first, second and third aspect of the present invention may be performed.
Figure 3B:
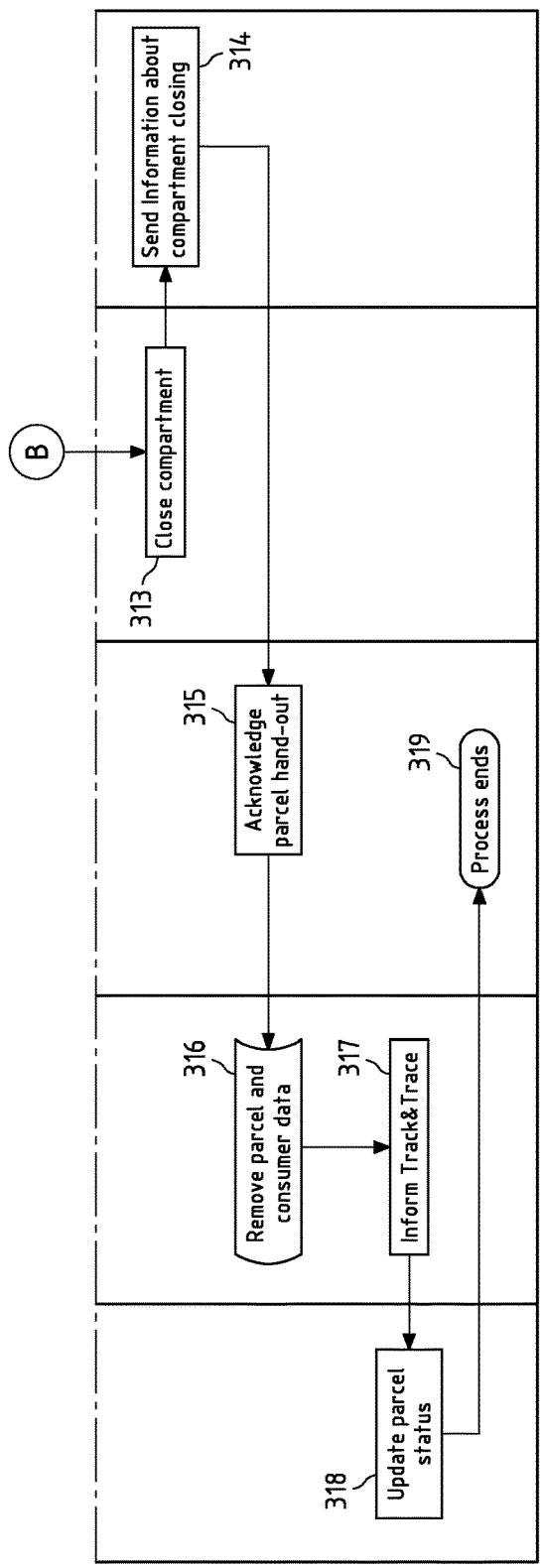

A prerequisite for this is that the consumer app 40 has been installed on the consumer's mobile device 4 (e.g. smartphone). The consumer 41 may for instance find a link to an AppStore (e.g. the Apple App Store or Google Play-Store) in the email or on the notification card (e.g. as a QR Code), resp. This makes it easy to install the consumer app 40 on the mobile device 4. Once the app 40 is installed, the consumer 41 may begin the pick-up process that is visualized in the flowchart 300 of FIG. 3a and FIG. 3b. Therein, example embodiments of the method according to the first, second and third aspect of the present invention may be performed in the context of the flowchart of FIG. 3a and FIG. 3b (in particular with respect to its steps 310 and 311), as will be further discussed with reference to the flowchart 500 of FIG. 5a and FIG. 5b below.

Scenario 1: Consumer Gets an Email with Link and SMS with PIN

Figure 2A:
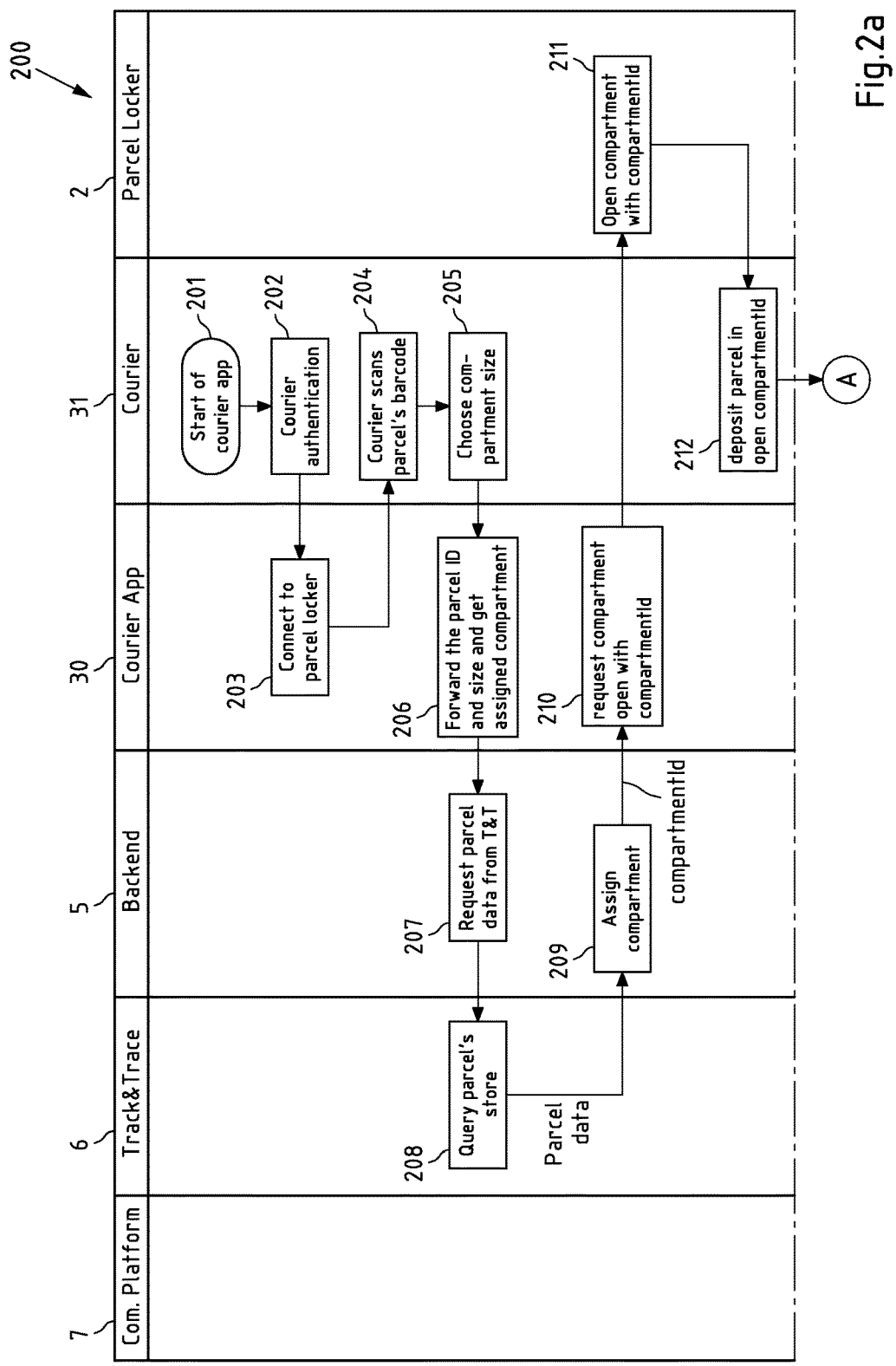
FIG. 2a and FIG. 2b provide a flowchart showing a use case of parcel delivery by a courier into a compartment of a parcel locker, in the context of which example embodiments of the method according to the first, second and third aspect of the present invention may be performed.
Figure 2B:
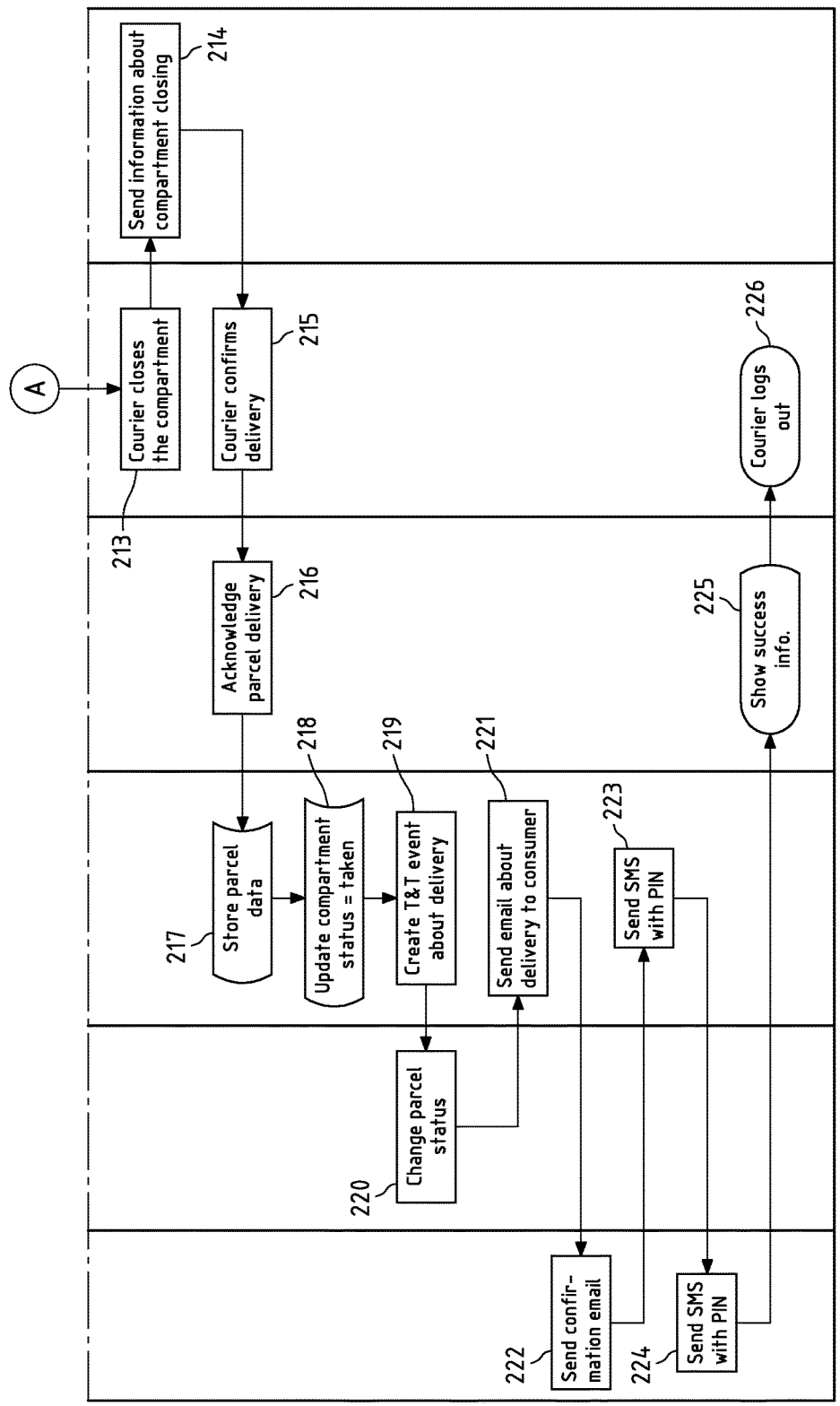

The "happy day" process may then for instance take the following shape:

In front of the parcel locker 2, the consumer 41 opens the email sent in step 222 of FIG. 2a and FIG. 2b and follows the link to the consumer app 40 contained in the email (301). The link contains a special prefix which will get recognized by consumer app 40 together with a generated number which identifies the parcel, and the app 40 starts automatically (302).

It is not required that the consumer identifies himself after starting the app. The PIN-based process that is necessary to open a compartment (see below) is sufficiently safe to make sure that only authorized consumers 41 may pick up a specific parcel. To prevent brute force attacks, the compartment and parcel will be blocked after 3 unsuccessful attempts.

The consumer 41 starts the pick-up process on the app and is asked to enter the PIN code he/she received via SMS (303). PIN and parcel number will be submitted to the backend system 5.

The app 40 calls the backend system 5 to validate the generated number from the link and PIN pair (304).

After successful PIN validation (305), the app 40 will automatically connect to the parcel locker 2 via Bluetooth (306).

Consumer 41 clicks the button "pick-up the parcel" (307). The consumer app 40 calls the backend system 5 to get the corresponding compartment number (compartmentId) containing the parcel linked to the number passed via link (308, 309). The answers from the backend system 5 are sent, via consumer app 40, to the physical parcel locker 2 in a request to open the specified compartment (310).

The consumer 41 takes the parcel from the compartment and closes it (310-313).

The parcel locker 2 will sent a "compartment door closed" event to the consumer app 40 which will forward this information to the backend system 5 (314, 315). As a result, the compartment status is updated and the parcel and user data are removed from the backend system 5 (316).

Track & trace system 6 will be informed via event that the parcel has been collected by consumer (317, 318).

The following exceptions from this "happy day" process are conceivable:

If the PIN the consumer 41 enters is not valid an error message is shown; no compartment will be opened. The PIN is linked to one particular generated number and thus to one particular parcel.

If the consumer 41 enters invalid PIN three times, the parcel pick-up will be blocked. The courier 31 must collect the parcel and bring it to the depot.

Scenario 2: Consumer Gets a Notification Card with Barcode and PIN

The "happy day" process in this scenario would be as follows:

In front of the parcel locker 2, the consumer 41 starts the consumer app directly from menu of his mobile device 4.

The consumer 41 starts the pick-up process on the app 40 and is asked to enter the PIN code and bar code number from the notification card. The barcode number may for instance be optically acquired from the notification card via the mobile device 4 of the consumer 41. Alternatively, the barcode number may be represented in human-readable form on the notification card and may then be read by the consumer 41. Both, the PIN and the barcode number will be submitted to the backend. The barcode number may be necessary for security reasons. It is similar to the one send in the link in the email of Scenario 1 described above.

The app 40 then calls the backend system 4 to validate the number and PIN pair. After successful PIN validation, the app 40 will automatically connect to the parcel locker 2 via Bluetooth.

Consumer 41 then clicks the button "pick-up the parcel". The consumer app 40 calls the backend system 5 to get the corresponding compartment number containing the parcel linked to the barcode number. The answers from the backend system 5 are sent, via consumer app 40, to the physical parcel locker 2 in a request to open the specified compartment.

The consumer 41 takes the parcel from the compartment and closes it. The parcel locker 2 will sent a "compartment door closed" event to the consumer app 40 which will forward this information to the backend system 5. As a result, the compartment status is updated and the parcel and user data are removed from the backend system 5.

The track & trace system 6 will be informed via event that the parcel has been collected by the consumer 41.

The following exceptions from this "happy day" process are conceivable:

If the PIN and/or barcode number the consumer enters are not valid, an error message is shown; no compartment will be opened. The PIN is linked to one particular generated number and thus to one particular parcel.

If the consumer enters invalid PIN and/or barcode number three times, the parcel pick-up will be blocked. The courier 31 must collect the parcel and bring it to the depot.

In the following, further exemplary characteristics of the system 1 of FIG. 1 will be described.

Database 52 of backend system 5 may store information on
- Parcel lockers, especially identification number, address
- Compartments, especially compartmentId, status (empty, occupied), if occupied: parcel number, consumer information (email address, mobile number), delivery date
- Couriers, especially user name and (possibly encoded) password
- Consumer blacklist, i.e. a list of consumers (identified by their email address and/or mobile number) that do not want to receive parcels via the parcel locker 2

The physical parcel lockers 2 of system 1 should be self-sufficient. To achieve this, they are equipped with batteries and/or solar cells. In order to minimize the electric power consumption, Bluetooth Low Energy protocol (BLE) is chosen.

IBeacon is a new technology to broadcast a small amount of information. In system 1, iBeacons are used to broadcast an identifier of the respective parcel locker. This identifier enables the mobile app 40 to connect to physical parcel locker 2 automatically regardless what parcel locker 2 the user (courier 31 or consumer 41) is standing by. All information required to establish the BLE connection is acquired from the backend system 5 upon provision of the parcel locker identifier. This brings the flexibility of configuration and best user experience (nothing has to be entered manually). Advantageously, the iBeacon is hidden inside the physical parcel locker 2 so no one can tamper this identifier.

To achieve a high level of security in the system of FIG. 1, some or all of the following measures are implemented:
- To secure BLE transmission, end-to-end AES encryption between parcel locker 2 and backend system 5 is implemented.
- To secure communication with backend system 5, self-signed security tokens and SSL are implemented.
- To ensure the backend identity, certificate pinning is implemented.

The system 1 of FIG. 1 may not preserve personal or parcel data, after the parcel is delivered, unless the consumer 41 allows it explicitly for e.g. the blacklist. All data is removed from the database 52 as soon as the parcel is picked up. If a problem occurs, data is stored only as long as it is needed to resolve the issue.

An authentication and authorization component of backend system 5 is responsible for authentication and authorization (consumer and courier roles). It spans over all other public outbound interfaces as a thin spring security layer. Spring Security builds the abstraction layer and JSON Web Tokens (JWT, see RFC 7519) will be used to create and validate stateless security tokens. Every call to the backend must include valid security token which is checked every time. This approach future oriented and enables complete statelessness of functional components.

A key management component of backend system 5 is the core component for cryptography. It stores the parcel locker keys and the keys assigned to consumers 41 during parcel delivery. It provides an interface to en- and decrypt of data, using one of the stored keys. The requirement is, not to respond with keys in raw form (unencrypted) but to use them to process encryption.

Every parcel locker 2 of system 1 has its own secret key (denoted PKA Key) used for encryption (as well as for parcel delivery and parcel pick-up by couriers 31) and every consumer 41 has a unique key for each parcel (denoted Transaction Consumer Key, TCK) used for parcel pick-up by consumer 41. PKA keys are fix (but for instance configurable, e.g. via a firmware update), whereas TCK keys are generated and assigned individually for every parcel-consumer pair. The keys may for instance be 16 bytes long.

Communication with physical parcel locker 2 is possible over Bluetooth (BT) 4.0 (esp. Bluetooth Low Energy, BLE) network technology without pairing ("Just Works" Task Flow). As soon as the connection is established, the Mobile Apps 30, 40 as well as physical parcel locker 2 are able to send messages and status reports to each other. For example the courier app 30 sends command "Open Compartment 1", as a response from physical parcel locker 2, the app could receive status report "Compartment 1 opened". "Just Works" enables two BT devices to pair without interaction with end user (consumer 41 or courier 31). As soon as the pairing process succeeds, a bidirectional communication channel is established.

The communication with physical parcel locker 2 is stateless. This means, that all messages are self-contained and consecutive messages don't depend on the physical parcel locker state between the transmissions.

The multi-channel communication platform 7 sends emails and SMS Messages to the consumer 41. The following messages may for instance be sent:

1. Consignee notification: Consumers 41 receive emails in case a parcel is awaiting for him/her in physical parcel locker 2. Apart from the informative character of the messages, they contain a unique link referencing parcel detail information (and optionally also consignee information).

2. Consignee auto-registration: Consumers 41 receive SMS with personal PIN number to verify their identity.

Mobile applications 30, 40 for courier 31 and consumer 41 are very similar and are de-scribed together. Both of the mobile apps: courier app 30 and consumer app 40 can be started directly from the respective mobile device's menu. Additionally, the consumer app 40 is able to start indirectly, via a link. This is done by special prefix placed in the link (e.g. http://dhl.parcellocker?param1=value1&param2=value2). In this way, additional parameters may be passed to the app. During use of mobile apps 30, 40, no sensitive data are stored on the mobile device 3, 4. No consumer data or any other data will be persisted.

In the following, the security concept of the system 1 of FIG. 1 will be further explained, and example embodiments of the methods according to the first, second and third aspect of the invention will be presented.

One of the major non-functional requirements for system 1 is that it must be ensured that the parcel locker 2 may be operated securely. It must be ensured that delivery of a parcel via parcel locker 2, from a safety and reliability point of view, is comparable to a personal delivery to the consumer 41.

The design of the security concept of system 1 is based on one or more of the following objectives and assumptions: The transmission of data within system 1 has to be secured. The computation complexity on parcel locker side and within the apps 30, 40 should be low or even minimal; hence, complex security checks should be done within the parcel locker backend system Physical parcel locker 2 and parcel locker backend system 5 have to ensure that sensitive information such as security keys are stored securely. Neither of mobile apps (consumer app 40 and courier app 30) should store sensitive data such as keys for encryption and/or for calculation of the response to a challenge. To make sure that security measures do not have a negative effect on the performance of system 1, communication between components should be restricted to the minimum. There should be a good balance between security measures and usability. At any given time, there is at maximum one app 30, 40 connected to a physical parcel locker 2.

Every user must provide identity before using the consumer app 40 as well as the courier app 30. Thus it is ensured that only authorized people have access to the physical parcel locker 2.

Both of the processes (courier authentication and consumer authentication) are different and are discussed separately.

Courier Authentication

For couriers 31, the authentication process may for instance be as follows: Couriers 31 identify themselves by giving a pre-defined username and password. When the user chooses his or her password, the system will check the quality of the password to ensure that the password is hard to guess.

The courier 31 provides his credentials in the login screen of the courier app 30 and then types in the password. After three (or less or more, this may be configurable) unsuccessful login attempts, the courier account is locked. It may be unlocked by back office employees. To unlock the account, additional verification on the line must be conducted.

In case of a successful authentication in the parcel locker backend, a security token is issued and transferred back to the courier app 30. This token is valid for the courier session until log-out, but may for instance expire after a configurable time (e.g. 10 min, to allow courier 31 to accomplish his tasks during one login). After this time courier 31 need to log-in again.

To strengthen the security on the courier side, the one or more of the following may be considered as a way to go:

Use managed mobile devices 3 for couriers as a way to retain the control over the devices and to build up a secure sandbox around the app 30. An example of such an Mobile Device Management (MDM) application is AirWatch As a option for courier to login, the advantage of biometric reader can be Strong password policy. Hard to guess, but easy to input. The couriers should be requested to change their password regularly.

The courier log-in possibility should be disabled during off hours (e.g. at night).

Consumer Authentication

The consumers 41 authenticate themselves in a different way than couriers 31. To maximize user experience, this is performed without user registration. Instead, when picking up a parcel from the parcel locker 2, the consumer 41 is requested to provide parcel-specific information that was sent to the consumer 41 after successful delivery, either electronically (e.g. email and SMS) or on a (printed/written-on-paper) notification card. Only if the consumer 41 enters the correct information, the parcel locker 2 will open the compartment that holds the consumer's parcel. Thus, unauthorized access to parcel locker 2 compartments is prevented.

To implement this approach, the backend system 5 will generate a unique number for each parcel (denoted as "generated number" in this specification) and a unique PIN. This generated number may however not be the parcel-ID from the label (which is inter alia user for tracking purposes). It may be a unique (and for instance opaque) number that is specific for system 1. The generated number will for instance either be computed based on the consumer's mobile number and the parcel ID, or based on the barcode that refers to (e.g. is present on) the (pre-printed) notification card that is provided to the consumer 41.

When picking up the parcel, both the generated number (or information associated with the generated number) and the PIN are required by the consumer 41 in order for the authorization to be completed successfully.

However, it may depend on the delivery type (direct delivery vs. not@home delivery) and on the availability of user contact information at the backend system 5 how this information is provided to the backend system 5. In case of direct delivery to the parcel locker 2, and if the mobile phone number and email address of the consumer 41 is known, the generated number (or information associated with the generated number, e.g. information allowing deduction of the generated number) is provided by email and the PIN is provided by SMS to the consumer 41. In case of direct delivery where either of the mobile phone number or the email address of consumer 41 is not known, and in case of not@home delivery, a pre-printed notification card bearing a barcode (and/or a human-readable code) is used that has the PIN written or printed thereon by the courier 31 or its device 3 and that is physically provided to the consumer 41. The barcode constitutes information associated with the generated number (which was generated based on the barcode) and can be used by the backend system 5, together with the PIN, for authentication of consumer 41.

The information from the notification card (barcode number and PIN) must be entered by consumer 41 manually in consumer app 40.

In case that an email with the generated number has been sent to consumer 41, only the PIN needs to be entered manually by consumer 41; the generated number is deduced automatically from the link in the E-Mail.

Consumer 41 has e.g. three attempts to enter the correct PIN that matches either the generated number from the link or the number/barcode from the notification card (to be checked by the backend system 5). After an unsuccessful third attempt, the parcel is blocked for consumer pick-up. The courier 31 must collect it and take it to the depot.

After successful authentication, a short-living (e.g. 1 minute, for instance configurable) security token will be issued which can then be used by consumer app 40 to communicate with backend system 5.

In example embodiments of the present invention, the communication of mobile apps 30, 40 and the backend system 5 is based on HTTP protocol secured with SSL/TLS. Additionally, mobile apps may for instance always check the backend system's digital certificate to ensure the correct data origin (for instance so called Certificate and Public Key Pinning). For instance, every HTTP call, except in the login, may have to contain a valid JWT security token, obtained after successful login for courier 31 and for consumer 41 as already explained above.

The security token, issued by the parcel locker backend system 5 during the authentication process, is for instance a JSON Web Token (JWT). This token consists of data identifying the particular parcel (stored in a compartment of the parcel locker 2) or the courier 31 (e.g. together with their roles) (payload) and a signature. To calculate the signature, a secret key is used which is known only to the core components of backend system 5. This signature is checked in every call to the backend system 5 to ensure that the data hasn't been modified. If so, the token is rejected.

Every token has living time. If the token expires, it cannot be used to authenticate the consumer 41 or courier 31 anymore. After courier log out, the token is invalidated on backend system 5 and will be rejected if used again even if it hasn't expired yet.

This approach allows the micro-services to be completely stateless, but still being able to validate the token. As an option, the token can be encrypted to hide the data of the payload. This process is known as JSON Web Encryption as part of the standard.

To obtain the security token, an easy-to-use REST endpoint may for instance be provided. To get the access token, for instance the following flow must be conducted:

1. Mobile app 30 or 40 gathers courier username/ID and password (in case of courier authentication) or parcel identifier (generated number or barcode number) and PIN (in case of consumer authentication), respectively.
2. Mobile app 30 or 40 sends this data to the/users/login endpoint as JSON payload
3. As a result, the caller (mobile app 30 or 40) gets a JWT access token
4. After successful authentication, JWT token must be enclosed, e.g. as HTTP "Authorization" Header in every following HTTP-call to the backend system 5.
5. If the token is not needed anymore, the logout endpoint is called and the token is invalidated.

One of the important security aspects may in particular be that at the same time, only one user (courier 31 or consumer 41) can be paired with the physical parcel locker 2. This ensures the consistency of transmitted data.

The transmission of sensitive data like the TCK key (see above) may be end-to-end encrypted. This means that the data is encrypted in backend system 5, sent to mobile app 30 or 40, which in turn forwards it to the physical parcel locker 2 where data is decrypted.

In order to avoid replay attacks, according to example embodiments of the present invention, so called "challenges" are exchanged between physical parcel locker 2 and mobile apps. The answer for a challenge is HMAC (key, challenge), where key is either Parcel Locker key (PKA) in case of courier communication, and consumer key (TCK key) in case of consumer communication.

To avoid Man-In-The-Middle attacks, each challenge should advantageously contain an expiration time. The period of time must allow at most the communication flow to complete (under consideration of latency and computation effort). The expiration time should be checked in parcel locker 2, and all expired challenges should be rejected.

Due to the unsecure nature of the Bluetooth protocol used for communication between the parcel locker 2 and the mobile devices 3 and 4, all sensitive messages are for instance encrypted before transmission over the Bluetooth channel. Even securely paired Bluetooth devices are prone to external attacks. Every manufacturer may implement the secure protocol differently. To counter this security issue and overtake the incompatibility problems, end-to-end (e.g. proprietary) encryption between backend system 5 and physical parcel locker 2 is used in example embodiments of the present invention. A so-called secure data sandbox may thus be built inside which the message is placed.

All encrypted messages are decrypted upon arrival at the destination which is either physical parcel locker 3 or parcel locker backend system 5. The payload, which must remain secret, won't be decrypted in the mobile apps 30/40 but just forwarded. This invalidates the need to store secure keys (PKA/TCK keys) on the mobile devices 3/4 and prevents them to leak out, e.g. due to malware installed on the mobile devices 3/4.

In order to allow the parcel locker 2 to compute the encrypted datagrams (the physical parcel locker 2 may not provide much computation power), Advanced Encryption Standard (AES) symmetrical encryption algorithm is used.

This algorithm is comparably lightweight (in particular compared to asymmetric encryption) and provides strong encryption. The Key-length should preferably fit into 64 Byte storage space.

The payload between backend system 5 and parcel locker 2 is encrypted exclusively with the Parcel Locker Key (PKA Key) (which is also used in the challenge-response procedure conducted when courier 31 seeks access to parcel locker 2). Alternatively, a different symmetric key may be used.

The PKA keys used to calculate courier challenge answers as well as for transmission encryption are constantly stored in the respective parcel locker 2 and in backend system 5. In preferred embodiments of the present invention, each parcel locker 2 has a unique PKA key (that is different from all other PKA keys used by backend system 5). Alternatively, a joint PKA key may be used for a couple of or even all parcel lockers 2 that are associated with backend system 5.

The TCK keys used to calculate consumer challenges are stored in backend system 5 and in the parcel locker 2 only for the duration of parcel delivery. TCK keys are generated dynamically as needed. PKA keys, on the other hand, are generated and stored in parcel locker 2 e.g. during production or commissioning.

To ensure that the TCK keys and most importantly the PKA keys won't be compromised, the key management is for instance encapsulated in a separate KeyManagement component in backend system 5 (e.g. in server 50). The data is for instance stored in separate tables/tablespaces so, that fine-grained permissions can be granted to IT administrators and/or developers. The KeyManagement component may not publish any API which enables consumers 41 to obtain raw keys. It may allow the users only to encrypt raw messages or decrypt payloads and returning raw messages. Nevertheless, this API should preferably only be accessed from within the backend system 5.

In the following. the processes of delivering a parcel by a courier 31 and of picking-up a parcel by a consumer 41 will be described with reference to FIGS. 4 and 5 from a security perspective.

In the examples of FIGS. 4 and 5, challenge validation on the parcel locker side is an important concept from a security point of view. As the parcel locker 2 is not directly connected to the Internet, it must authenticate the connecting users, using their own internet connection. To achieve this, parcel locker 2 generates challenge string and stores it together with current timestamp. Then it asks the requesting peer side (mobile app 30/40) to answer this challenge. The answer is the HMAC_KEY(challenge), where KEY is either PKA-Key when the courier 31 connects to the parcel locker 2, or the TCK key, when the consumer 41 connects to the parcel locker 2. The subsequent request coming from mobile app 30/40 must contain the challenge answer (H MAC result). The parcel locker 2 calculates the answer for his challenge on his own and compares with the one, provided by mobile app 30/40. If both are equal and the challenge answer has come in predefined time, the validation succeeds otherwise it fails.

Figure 4A:
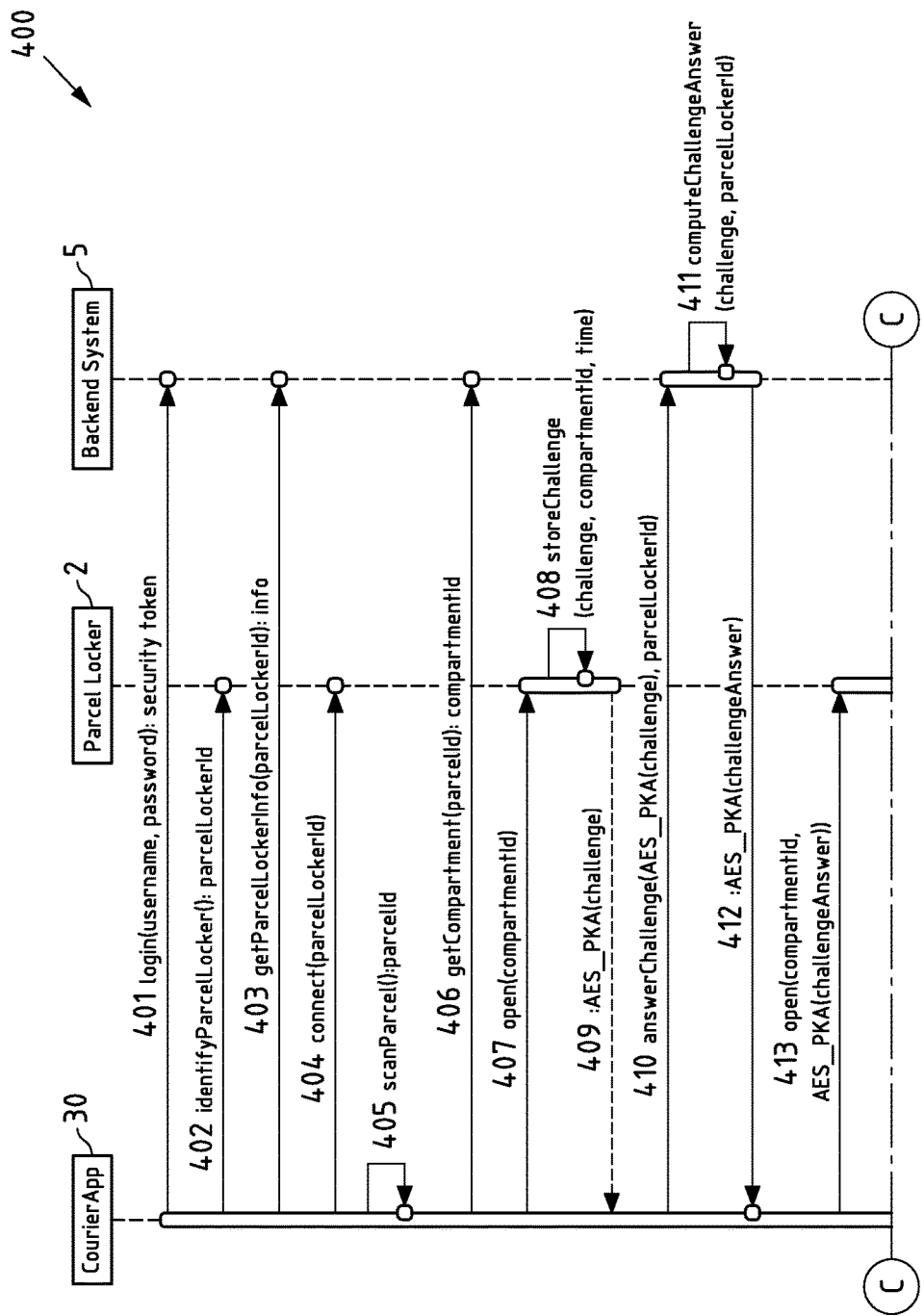
FIG. 4a and FIG. 4b provide a flowchart showing an example embodiment of the methods according to the first, second and third aspect of the present invention, focusing on the process of depositing a parcel in a compartment of a parcel locker by a courier.
Figure 4B:
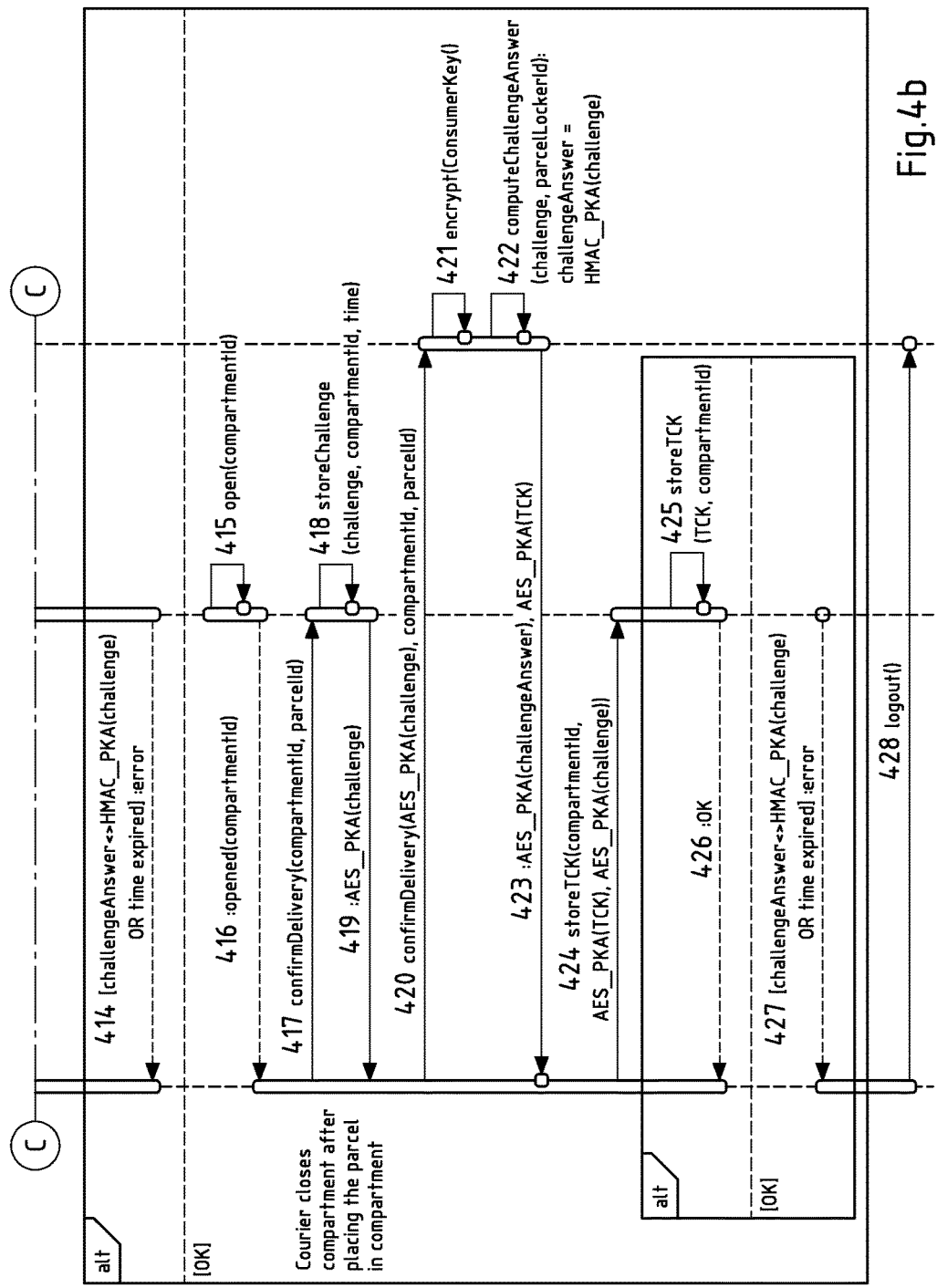

FIG. 4a and FIG. 4b are a flowchart 400 showing an example embodiment of the methods according to the first, second and third aspect of the present invention, focusing on the process of depositing a parcel in a compartment of a parcel locker 2 by a courier 31.

In FIG. 4a and FIG. 4b, the actions of courier app 30 (and thus also of mobile device 3 comprising courier app 30), parcel locker 2 and backend system 5 and the interaction of these three entities are illustrated. Therein, the actions/interactions performed by parcel locker 2 represent an example embodiment of the method according to the first aspect of the present invention, the actions/interactions performed by courier app 30/mobile device 3 represent an example embodiment of the method according to the second aspect of the present invention and the actions/interactions performed by backend system 5 (e.g. by or under control of backend server 50) represent an example embodiment of the method according to the third aspect of the present invention.

In FIG. 4a and FIG. 4b, inter alia the following notation is used: "AES_PKA( . . . )" indicates that a message (represented by " . . . ") has been AES-encrypted based on a PKA key. "HMAC_TCK(challenge) indicates that a HMAC has been computed of the challenge with the TCK key. Based on this explanation, the further notations used are self-explanatory.

FIG. 4a and FIG. 4b show the "happy day" process 400, where for simplicity of presentation, no exceptions occur.

The process 400 starts with step 401 when the courier 31 starts the app 30 and logs in at the backend system 5 by providing correct credentials (username and password). In response, a security token is returned as already discussed above. This logging-in of the courier 31 may for instance take place when the courier 31 arrives at parcel locker 2, and the security token may be valid for a period of time that is sufficient for the courier 31 to delivery all parcels intended for this parcel locker 2.

The physical parcel locker 2 will be identified (402) via an iBeacon that broadcasts information on the parcel locker 2 (402), e.g. an identifier of the parcel locker (parcelLockerId). The identification acquired via iBeacon is used to establish the BLE connection (403, 404). For instance, based on the identifier of the parcel locker, at least an address of parcel locker 2 required to set-up (or accelerate setting-up) communication between mobile device 3 and parcel locker 2 may be retrieved from backend system 5.

The courier 31 then, using his mobile device 3, scans an identifier of a first parcel (parcelId) to be delivered (405). This identifier may be printed on a label of the parcel. Alternatively, acquisition of the parcel identifier by mobile device 3 may be accomplished via electric, magnetic or electro-magnetic signals or fields, e.g. via RFID or NFC technology.

After requesting a compartment from the backend system 5 by courier app 30 and obtaining a compartment identifier (compartmentId) from backend system 5 (406), the open command for the compartment identified by the compartment identifier is sent from the courier app 30 to the parcel locker 2 via BLE (where also other communication technologies such as NFC or WLAN could be used) (407). As an answer, a (one-time) challenge (encrypted with the PKA key) is returned (409), and is stored associated with the compartment identifier (and for instance the time the challenge was generated, to be able to check later if the challenge is still valid when the response is received) at parcel locker 2 (408).

To be able to answer the challenge, the courier app 30 must ask the backend system 5 (410). The request comprises the encrypted challenge as well as the identifier of the parcel locker 2 as obtained in step 403). In step 411, the backed system 5 then computes a response based on the challenge and on the PKA key that is identified based on the parcel locker identifier. In the present example, the response (also denoted as answer to the challenge) is a HMAC of the challenge computed based on the PKA key. The resulting response is then further encrypted (with the PKA key) and sent to the courier app 30 (412)

As soon as the encrypted response arrives from backend system 5, the open command to the parcel locker 5 is repeated (413), this time however under inclusion of the encrypted response/challenge answer.

In parcel locker 2, the response/challenge answer is decrypted and validated, in particular by computing an expected response based on the challenge and the PKA key and comparing the result with the received response.

If the received response is successfully validated, the compartment identified by the compartment identifier stored for this challenge in step 408 is opened (415), otherwise, or if the validity of the challenge has expired, an error message is issued (414).

If the compartment is opened, an according information is returned to the courier app 30 (416). The courier 31 then places the parcel in the compartment, closes it manually and acknowledges the delivery in the app 30, which then acknowledges the delivery to the parcel locker 2 (417).

If parcel-specific TCK keys are to be used, it is necessary to associate such parcel-specific TCK keys with the compartment into which the parcel has been deposited. This will be described below. This procedure may be dispensable if instead of parcel-specific TCK keys, PKA keys would be used in the process of picking-up parcels by consumers 41 (i.e. if the response computed for a challenge in the process of picking-up a parcel would be based on a PKA key instead of a parcel-specific TCK key). However, using parcel-specific TCK keys for the pick-up procedure has the advantage that responses that are based on PKA keys are not made available to consumers 41 and their devices 4 at all, thus increasing safety for the PKA keys, and that the TCK key itself ensures that access is only possible to one compartment and not to other compartments of the parcel locker 2, and in particular is only possible to this one compartment during the time it stores a specific parcel, and not at a later time when it stores another parcel. The parcel-specific TCK key thus adds further security, irrespective of whether the challenge itself is also bound to a compartment identifier or not.

To this end, in step 418, a new (one-time) challenge is generated and stored, associated with the compartment identifier and the current time, at the parcel locker, and is transmitted, in encrypted form based on the PKA key, to the courier app 30 in step 419.

In step 420, the courier app 30 acknowledges the delivery to the backend system 5, and requests an answer to the challenge. This request includes the encrypted challenge, the compartment identifier and the parcel identifier.

The backend system then generates a TCK key (e.g. as a random or pseudo-random number) and encrypts it with the PKA key (421).

Then, in step 422, a response to the challenge is calculated based on the PKA key of parcel locker 2.

In step 423, the encrypted response/encrypted challenge answer arrives from the backend system 5 together with the encrypted TCK key.

An acknowledgment including the encrypted response/encrypted challenge answer, the compartment identifier and the encrypted TCK are then sent to parcel locker 2 in step 424.

If the received response/challenge answer matches the expected response/challenge answer determined locally at the parcel locker 2 and if the validity of the challenge has not yet expired, the TCK key is stored in the parcel locker 2 for the compartment identified by the compartment identifier (425), and an acknowledgement is sent to the courier app 30 (426). Otherwise, an error message is issued (427).

In step 428, the courier app 30 logs out from backend system 5, for instance upon request by the courier 31, or automatically after a time-out.

Figure 5A:
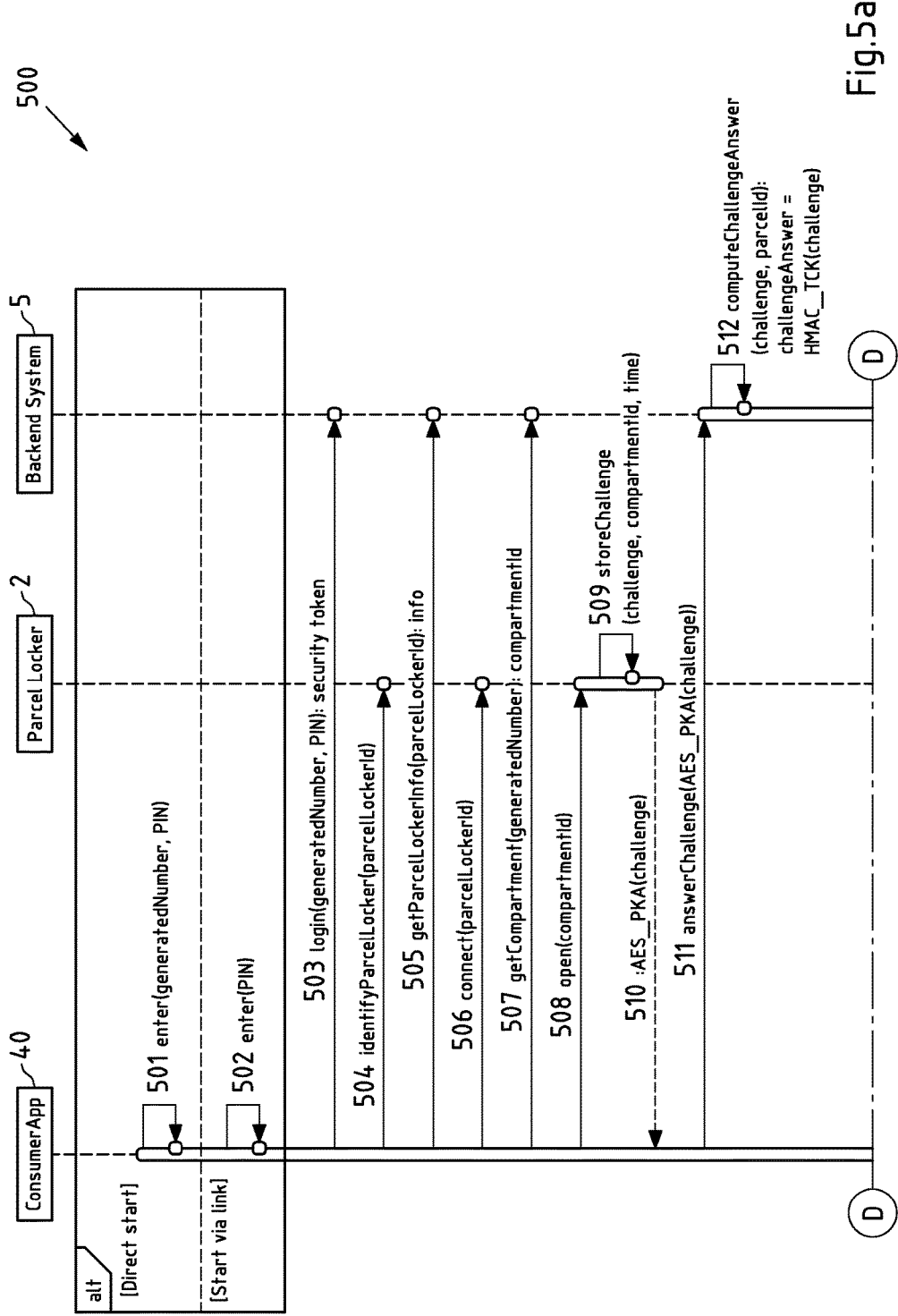
FIG. 5a and FIG. 5b provide a flowchart showing a further example embodiment of the methods according to the first, second and third aspect of the present invention, focusing on the process of picking-up a parcel from a compartment of a parcel locker by a consumer.
Figure 5B:
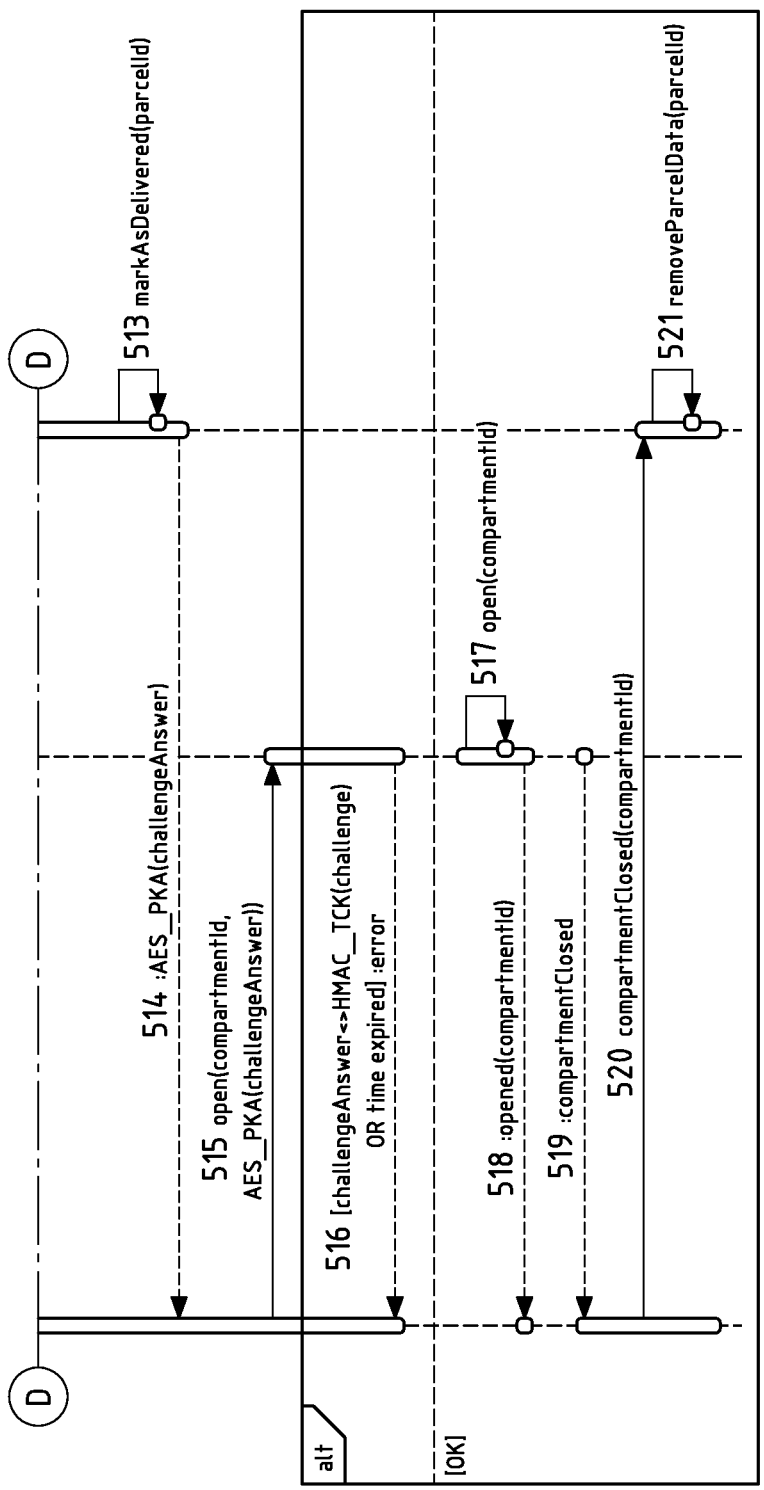

FIG. 5a and FIG. 5b are a flowchart 500 showing a further example embodiment of the methods according to the first, second and third aspect of the present invention, focusing on the process of picking-up a parcel from a compartment of a parcel locker 2 by a consumer 41. The parcel may for instance have been deposited in the compartment of parcel locker 2 according to a process as described with reference to FIG. 4a and FIG. 4b above.

In FIG. 5a and FIG. 5b, the actions of consumer app 40 (and thus also of mobile device 4 comprising consumer app 40), parcel locker 2 and backend system 5 and the interaction of these three entities are illustrated. Therein, the actions/interactions performed by parcel locker 2 represent an example embodiment of the method according to the first aspect of the present invention, the actions/interactions performed by consumer app 40/mobile device 4 represent an example embodiment of the method according to the second aspect of the present invention and the actions/interactions performed by backend system 5 (e.g. by or under control of backend server 50) represent an example embodiment of the method according to the third aspect of the present invention.

In FIG. 5a and FIG. 5b, inter alia the following notation is used: "AES_PKA( . . . )" indicates that a message (represented by " . . . ") has been AES-encrypted based on a PKA key. "HMAC_TCK(challenge) indicates that a HMAC has been computed of the challenge with the TCK key. Based on this explanation, the further notations used are self-explanatory.

FIG. 5a and FIG. 5b show the "happy day" process 500, where for simplicity of presentation, no exceptions occur.

The consumer 41 starts the consumer app 40, either via a link received in an email or directly from a menu. Depending on the case he/she has to enter only PIN (step 502, e.g. the PIN received via SMS), or PIN and the generated parcel number/barcode number (step 501, where PIN and generated parcel number/barcode number may be taken by consumer 41 from a notification card), as explained above. The app 40 then performs the login at backend system 5 based on the generated number/barcode number and PIN and acquires a security token (503).

In step 504, the parcel locker 2 will be identified via its iBeacon. The identification (parcelLockerId) acquired via iBeacon is used to establish the BLE connection between mobile device 4 and parcel locker 2 (505, 506).

The generated parcel number/barcode number is passed to backend system 5 to acquire the actual compartment identifier (compartmentId) of the compartment of parcel locker 2 where the parcel is stored (507).

The open command (including the compartment identifier) is then sent to the parcel locker 2 via BLE (508).

In reaction thereto, a (one-time) challenge is created by parcel locker 2, stored (509) with its associated compartment identifier and the current time and returned, in encrypted form, to the consumer app 40 (510).

To answer the challenge, consumer app 40 must ask the backend end system 5 (511).

The backend system 5 then calculates HMAC_TCK for the challenge (based on the TCK key) (512) and returns it (in encrypted form, based on the PKA key of parcel locker 2) to the consumer app 40 (514). In parallel, the parcel is marked as delivered (513) at the backend system 5.

As soon as the encrypted response/challenge answer (HMAC_TCK) arrives from backend system 5, the open command to the parcel locker 2 is repeated by the consumer app, this time with the encrypted response/challenge answer (151) (and also the compartment identifier).

In parcel locker 2, the response/challenge answer is decrypted and validated, in particular by computing an expected response based on the challenge and the PKA key and comparing the result with the received response.

If the received response is successfully validated, the compartment identified by the compartment identifier stored for this challenge in step 509 is opened (517) and opening of the compartment is reported to the consumer app 40 (518), otherwise, or if the validity of the challenge has expired, an error message is issued (516).

As soon as the compartment gets closed by consumer 41, an according acknowledgement is sent to backend system 5 via consumer app 4 (519, 520), and the parcel data is then removed from backend system 5 (521).

In example embodiments of the present invention, the challenges are always related to one or more compartments, thus they should contain the identifiers (compartmentId) of the one or more compartments together with a random byte chain.

The challenges may for instance fulfill one or more of the following criteria:
1. The random bytes are unique.
2. The way how the random bytes are generated is impossible to guess, based on already generated ones, so that it is impossible to foresee the next challenge.
3. The Challenge is valid only for defined period of time, e.g. 60 seconds. After the expiration, even valid answers must be rejected with appropriate error code. This must be realized on parcel locker.
4. One challenge is related only to the defined compartment(s) and not to other.
5. Challenges which were answered incorrectly are not used anymore. There should be no replies. Challenge is of one-time usage to disable the brute force attacks.

In example embodiments of the present invention, inter alia the following commands may be exchanged between mobile apps 30/40 and parcel locker 2.

The following requests may for instance be issued by the apps 30/40:

COURIER_OPEN_COMPARTMENT
This call from courier app 30 initializes the opening of particular compartments (see for instance step 407 of FIG. 4a and FIG. 4b). In case more than one compartment should be opened at once (e.g. in case of pick-up of overdue or redirected parcels from the parcel locker 2 by courier 31), a list of compartment-IDs is sent. The present command differs from the open command sent by consumer 41 thus it is defined as a separate command. Preferably, no additional compartment can be opened if at least one other compartment is already opened. Additional parameters containing compartments which should be ignored in this check, could be provided in the command itself.

COURIER_OPEN_COMPARTMENT_WITH_CHALLENGE
This call from courier app 30 is the subsequent request for opening the compartment by courier 31 (see for instance step 413 of FIG. 4a and FIG. 4b). In this case, the challenge answer is provided as well. In order to avoid tempering, the payload contains the list of one or more compartment-IDs to open together with the challenge answer. Preferably, no additional compartment can be opened if at least one other compartment is opened. Additional parameters containing compartments which should be ignored in this check, could be provided in the command itself. The parcel locker 2 must validate the received answer to the challenge answer as already described above. It may in particular be important to check the request on the parcel locker side whether it is the same as the preceding COURIER_OPEN_COMPARTMENT call and requests the same compartment(s). Otherwise, a Man-In-the-Middle attack could be possible. If the challenge answer is valid (e.g. equals to the expected one), the provided compartment Id(s) should be opened.

CONSUMER_OPEN_COMPARTMENT
This call from consumer app 40 initializes the opening of one particular compartment by consumer app 40 (see for instance step 508 of FIG. 5a and FIG. 5b). It differs from the similar COURIER_OPEN_COMPARTMENT call (see above) in that the consumer version takes only one compartmentId. Preferably, already opened compartments must not hinder consumer 41 to open his compartment.

CONSUMER_OPEN_COMPARTMENT_WITH_CHALLENGE
This call from consumer app 40 is the subsequent request for opening the compartment by consumer 41 (see for instance step 515 of FIG. 5a and FIG. 5b). In this case, the challenge answer is provided as well. Preferably, already opened compartments must not hinder the consumer to open his compartment. The parcel locker 2 must validate the received challenge answer. It may be important to check the request on the parcel locker side whether it is the same as the earlier CONSUMER_OPEN_COMPARTMENT call and requests the same compartment. Otherwise, a Man-In-the-Middle attack could be possible. If the challenge response is valid (equals to the expected one), the provided compartmentId should be opened.

Every request sent to parcel locker is preferably answered with a response. This response depends on the request type. The following responses from the parcel locker 2 may be possible:

CHALLENGE
This is the answer from parcel locker 2 for every command sent from mobile app peers (see for instance steps 409 and 419 of FIG. 4a and FIG. 4b and step 510 of FIG. 5a and FIG. 5b). For every request, parcel locker must ensure the valid identity of the mobile app peer (courier 31 or consumer 41) by sending a challenge to the mobile app peer. The challenge should preferably be encrypted. The encryption is preferably done using the PKA key. The challenge response may or may not be also encrypted.

OPENED_COMPARTMENTS
This message is returned by parcel locker 2 as a response to COURIER_OPEN_COMPARTMENT_WITH_CHALLENGE and CONSUMER_OPEN_COMPARTMENT_WITH_CHALLENGE when the challenge provided in the request has been successfully validated (see for instance step 416 of FIG. 4a and FIG. 4b and step 518 of FIG. 5a and FIG. 5b). This message returns information about successfully opened compartments and also information about compartments which were not opened, because of e.g. physical failure. The list of open compartments may only contain compartments which were opened and were also requested to be opened in COURIER/CONSUMER_OPEN_COMPARTMENT_WITH_CHALLENGE commands. If a compartment was already opened and was not requested to open, this compartment is not included in the OPENED_COMPARTMENTS response. If compartment was already opened and was requested to open again, then this compartment must be included in the OPENED_COMPARTMENTS response regardless if the opening was really necessary or not.

CLOSED_COMPARTMENTS

This message is returned by parcel locker if the compartment gets manually closed (see for instance step 519 of FIG. 5a and FIG. 5b).

ALREADY_OPENED_COMPARTMENT

This response indicates that no compartments were opened because some are still open. It happens if e.g. COURIER_OPEN_COMPARTMENT or COURIER_OPEN_COMPARTMENT_WITH_CHALLENGE was sent previously but some old compartments were still open. This old compartments should be closed first, before the new ones gets opened. In this case, no compartments will be open.

Figure 6:
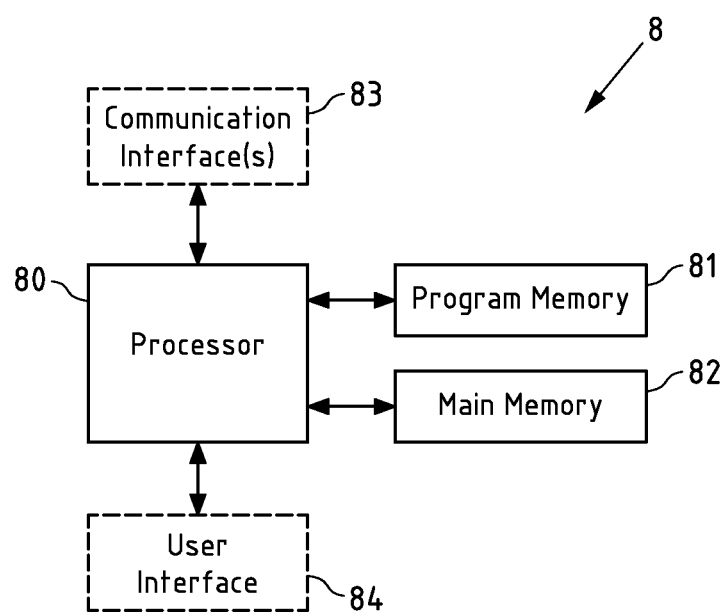
FIG. 6 shows a schematic block diagram of an apparatus according to the first, second or third aspect of the present invention.

FIG. 6 is a schematic block diagram of an apparatus 8 according to an example embodiment of the present invention. Apparatus 8 may for instance be an apparatus according to the first, second or third aspect of the present invention.

Apparatus 8 comprises a processor 80, program memory 81, main memory 82, one or more communication interface(s) 83 and an optional user interface 84.

Apparatus 8 may for instance be configured to perform and/or control or comprise respective means (80-83) for performing and/or controlling the method according to the first, second or third exemplary aspect of the present invention (e.g. according to the flowcharts 400 of FIG. 4a and FIG. 4b or 500 of FIG. 5a and FIG. 5b). Apparatus 8 may as well be an apparatus comprising at least one processor 80 and at least one memory (81) including computer program code, the at least one memory and the computer program code configured to, with the at least one processor, cause an apparatus (e.g. apparatus 8) at least to perform and/or control the method according to the first, second or third exemplary aspect of the invention.

Processor 80 may for instance control at least one of the memories (81, 82), communication interface(s) 83 and the optional user interface 84.

Processor 80 may for instance execute computer program code stored in program memory 81, which may for instance represent a computer readable storage medium comprising program code that, when executed by processor 80, causes processor 80 to perform the method according to the first, second or third exemplary aspect of the present invention.

Processor 80 (and also any other processor mentioned in this specification) may be a processor of any suitable type. Processor 800 may comprise but is not limited to one or more microprocessor(s), one or more processor(s) with accompanying one or more digital signal processor(s), one or more processor(s) without accompanying digital signal processor(s), one or more special-purpose computer chip(s), one or more field-programmable gar array(s) (FPGA(s), one or more controller(s), one or more application-specific integrated circuit(s) (ASIC(s)), or one or more computer(s). The relevant structure/hardware has been programmed in such a way to carry out the described function. Processor 80 may for instance be an application processor that for instance runs an operating system.

Program memory 81 may also be included into processor 80. This memory may for instance be fixedly connected to processor 80, or be at least partially removable from processor 80, for instance in the form of a memory card or stick. Program memory 81 may for instance be non-volatile memory. It may for instance be a FLASH memory (or a part thereof) or a hard disc (or a part thereof), to name but a few examples. Memory may also comprise an operating system for processor 80. Program memory 81 may also comprise a firmware for apparatus 80.

In the apparatus 8, further a main memory 82 is present, for instance in the form of a volatile memory. It may for instance be a Random Access Memory (RAM) or Dynamic RAM (DRAM), to give but a few non-limiting examples. It may for instance be used by processor 80 when executing an operating system and/or computer program.

Communication interface(s) 83 enable apparatus 8 to communicate with other entities, as is apparent from the interactions illustrated between the entities of FIGS. 1, 4 and 5.

If apparatus 8 represents an apparatus according to the first aspect of the present invention, the communication interfaces 83 may for instance at least (or only) comprise a Bluetooth interface. If apparatus 8 represents an apparatus according to the second aspect of the present invention, the communication interfaces 83 may for instance at least comprise a Bluetooth interface and a cellular mobile radio interface. If apparatus 8 represents an apparatus according to the third aspect of the present invention, the communication interfaces 83 may for instance comprise an (e.g. wire-bound) interface to a gateway that allows for communicating with mobile devices 3 and 4 of FIG. 1 via a cellular mobile radio communication system.

Optional user interface 84 may comprise a display for displaying information to a user and/or an input device (e.g. a keyboard, keypad, touchpad, mouse, etc.) for receiving information (such as username and password, or generated number/barcode number and/or PIN) from a user. The user interface may for instance not be present when apparatus 8 represents an apparatus according to the first aspect of the present invention, but may for instance be present when apparatus 8 represents an apparatus according to the second aspect of the present invention.

Some or all of the components of the apparatus 800 may for instance be connected via a bus. Some or all of the components of the apparatus 800 may for instance be combined into one or more modules.

Finally, also the following embodiments of the invention shall be considered to be disclosed:

Embodiment 1

A method comprising:
transmitting a challenge from a locker system to a mobile device;
receiving a response from the mobile device at the locker system, wherein the response has been generated by a backend system, which received the challenge from the mobile device, at least based on the challenge received by the backend system and on a first key stored at the backend system and has been transmitted to the mobile device;
checking at the locker system whether the received response has been generated under usage of at least the challenge and a key that corresponds to a second key stored at the locker system; and
granting access to a compartment of the locker system at least depending on a result of the checking.

Embodiment 2

A method comprising:
receiving, at a mobile device, a challenge transmitted by a locker system;

transmitting the challenge received at the mobile device to a backend system;

receiving, at the mobile device, a response from the backend system, wherein the response has been generated by the backend system at least based on the challenge received from the mobile device and on a first key stored at the backend system;

transmitting the response received at the mobile device from the mobile device to the locker system [as at least a part of a proof of authorization for access to at least one compartment of the locker system], wherein access to a compartment of the locker system is granted by the locker system at least depending on a result of a checking whether the response received at the locker system has been generated under usage of at least the challenge and a key that corresponds to a second key stored at the locker system.

Embodiment 3

A method comprising:

receiving, at a backend system, a challenge transmitted by a mobile device;

generating, at least based on the challenge received from the mobile device and on a first key stored at the backend system, a response;

transmitting the response to the mobile device to enable the mobile device to transmit the response to a locker system, wherein the challenge received from the mobile device has been received by the mobile device from the locker system, and wherein access to at least one compartment of the locker system is granted by the locker system at least depending on a result of a checking whether a response transmitted to the locker system has been generated under usage of at least the challenge and a key that corresponds to a second key stored at the locker system.

Embodiment 4

The method according to any of the preceding embodiments, wherein the challenge is transmitted in response to a request received at the locker system from the mobile device, wherein the request contains an identifier of the compartment.

Embodiment 5

The method according to embodiment 4, wherein the compartment has been determined by the backend system from a larger group of compartments of the locker system, and wherein the identifier of the compartment has been transmitted from the backend system to the mobile device.

Embodiment 6

The method according to embodiment 5, wherein the compartment has been determined at least based on respective status information of at least the compartment maintained at the backend and/or based on information provided by the mobile device to the backend and associated with an object stored in the compartment.

Embodiment 7

The method according to any of the preceding embodiments, wherein the second key is unique for the locker system.

Embodiment 8

The method according to any of embodiments 1-6, wherein the second key is unique for the compartment of the locker system.

Embodiment 9

The method according to any of embodiments 1-6, wherein the second key is associated with a single use of the compartment only.

Embodiment 10

The method according to embodiment 9, wherein the second key is generated or selected by the backend system and transmitted towards the locker system for storage in the locker system.

Embodiment 11

The method according to any of embodiments 1-6, wherein the method is performed at least twice, first as a first process and then again as a second process, wherein in the first process, the second key is unique for the locker system and the mobile device is a mobile device of a first person; and wherein in the second process, the second key is unique for the compartment or associated with a single use of the compartment only, and the mobile device is a mobile device of a second person;

wherein in both the first process and the second process, access to the same compartment is granted.

Embodiment 12

The method according to embodiment 11, wherein in the first process, the first person is granted access to the compartment, and in the second process, the second person is granted access to the compartment.

Embodiment 13

The method according to embodiment 12, wherein the second key used in the second process for checking is generated or selected by the backend system and transferred from the backend system to the locker system via the mobile device of the first person.

Embodiment 14

The method according to any of the embodiments 11-13, wherein in the first process and the second process, the challenge and/or the response are exchanged between the backend system and the locker system via the mobile device in encrypted form based on a third key stored at the backend system and a fourth key stored at the locker system.

Embodiment 15

The method according to embodiment 14, wherein the third key is the first key used in the first process and the fourth key is the second key used in the first process.

Embodiment 16

The method according to any of the preceding embodiments, wherein the transmission of the challenge and the response between the locker system and the mobile device is at least partially based on a first wireless transmission technique, in particular Bluetooth, and the transmission of the challenge and the response between the backend system and the mobile device is at least partially based on a second wireless transmission technique that is different from the first wireless transmission technique, in particular cellular mobile radio communication.

Embodiment 17

The method according to embodiment 16, wherein information pertaining to the locker system is broadcast by the locker system, and wherein the mobile device receives the information and uses the information to set up communication with the locker system according to the first wireless transmission technique.

Embodiment 18

The method according to any of the preceding embodiments, wherein successful authentication of a user of the mobile device vis-à-vis the backend system is a necessary condition for reception of the response from the backend system.

Embodiment 19

The method according to embodiment 18 as far as it depends on embodiment 11, wherein in the first process, the user of the mobile device is the first person, and wherein the authentication of the first person is based on security information associated with the first person and/or with the mobile device of the first person.

Embodiment 20

The method according to embodiment 18 as far as it depends on embodiment 11, or according to embodiment 19, wherein in the second process, the user of the mobile device is the second person, and wherein the authentication of the second person is based on at least a first information associated with the compartment and/or with an object stored in the compartment and a second information.

Embodiment 21

The method according to embodiment 20, wherein the first information or information associated with the first information and the second information are provided to the mobile device of the second person and/or to the second person via respectively different provision channels.

Embodiment 22

The method according to embodiment 20, wherein the first information or information associated with the first information and the second information are provided to the mobile device of the second person and/or to the second person via the same provision channel, and wherein the provision channel is making a notification card bearing the first information or the information associated with the first information and the second information on it physically available to the second person.

Embodiment 23

The method according to any of the preceding embodiments, wherein the challenge comprises an identifier of the compartment to which access is desired.

Embodiment 24

The method according to any of the preceding embodiments, wherein access is jointly granted to a plurality of compartments based on a single challenge and a single response.

Embodiment 25

The method according to embodiment 24, wherein the single challenge comprises respective identifiers of the plurality of compartments to which access is desired.

Embodiment 26

The method according to any of embodiments 24-25, wherein the plurality of compartments have been identified by the backend at least based on respective status information of the compartments and/or based on respective information on one or more objects respectively stored in one or more of the compartments.

Embodiment 27

The method according to any of the preceding embodiments, wherein the checking comprises:
generating, at the locker system and at least based on the challenge and the second key stored at the locker system, an expected response; and
checking whether the received response matches the expected response.

Embodiment 28

A computer program when executed by a processor causing an apparatus to perform and/or control the method according to any of the embodiments 1-27.

Embodiment 29

An apparatus or system configured to perform and/or control or comprising respective means for performing and/or controlling the method according to any of the embodiments 1-27.

Embodiment 30

A system comprising at least two apparatuses, the system configured to perform and/or control or comprising respective means for performing and/or controlling the method according to any of the embodiments 1-27.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g. disk, memory, or the like) to be executed by such a processor. References to a 'computer-readable storage medium' should be understood to encompass specialized circuits such as FPGAs, ASICs, signal processing devices, and other devices.

The expression 'A and/or B' is considered to comprise any one of the following three scenarios: (i) A, (ii) B, (iii) A and B. Furthermore, the article 'a' is not to be understood as 'one', i.e. use of the expression 'an element' does not preclude that also further elements are present. The term 'comprising' is to be understood in an open sense, i.e. in a way that an object that 'comprises an element A' may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented of an example embodiment in a particular category (method/apparatus/computer program) may also be used in a corresponding manner in an example embodiment of any other category. It should also be understood that presence of a feature in a presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a person skilled in the art and can be implemented without deviating from the scope of the appended claims.

The invention claimed is:

1. An apparatus or system, the apparatus or system comprising at least one processor and at least one memory including computer program code, the at least one memory and the computer program code configured to, with the at least one processor, cause an apparatus or system at least to perform and/or control a method comprising:
   transmitting a challenge from a locker system to a mobile device;
   receiving a response from the mobile device at the locker system, wherein the response has been generated by a backend system, which received the challenge from the mobile device, at least based on the challenge received by the backend system and on a first key stored at the backend system and has been transmitted to the mobile device;
   checking at the locker system whether the received response has been generated under usage of at least the challenge and a key that corresponds to a second key stored at the locker system; and
   granting access to a compartment of the locker system at least depending on a result of the checking.

2. The apparatus or system according to claim 1, wherein the method that the apparatus or system is caused at least to perform and/or control further comprises:
   receiving, prior to the transmitting of the challenge from the locker system to the mobile device, a request for access to the compartment at the locker system and from the mobile device, wherein the request contains an identifier of the compartment.

3. The apparatus or system according to claim 2, wherein the compartment has been determined by the backend from a plurality of compartments of the locker system, and wherein the identifier of the compartment has been transmitted from the backend system to the mobile device.

4. The apparatus or system according to claim 3, wherein the compartment has been determined at least based on respective status information of at least the compartment maintained at the backend system and/or based on information provided by the mobile device to the backend and associated with an object stored in the compartment.

5. The apparatus or system according to claim 1, wherein the second key is associated with a single use of the compartment only.

6. The apparatus or system according to claim 5, wherein the second key is generated or selected by the backend system and transmitted towards the locker system for storage in the locker system.

7. The apparatus or system according to claim 1, wherein the at least one memory and the computer program code are configured to, with the at least one processor, cause the apparatus or system to perform and/or control the method at least twice, first as a first process and then again as a second process, wherein in the first process, the second key is unique for the locker system and the mobile device is a mobile device of a first person; and wherein in the second process, the second key is unique for the compartment or associated with a single use of the compartment only, and the mobile device is a mobile device of a second person;
   wherein in both the first process and the second process, access to the same compartment is granted.

8. The apparatus or system according to claim 7, wherein in the first process, the first person is granted access to the compartment, and in the second process, the second person is granted access to the compartment, and wherein the second key used in the second process for checking is generated or selected by the backend system and transferred from the backend system to the locker system via the mobile device of the first person.

9. The apparatus or system according to claim 7, wherein in the first process and the second process, the challenge and/or the response are exchanged between the backend system and the locker system via the mobile device in encrypted form based on a third key stored at the backend system and a fourth key stored at the locker system, and wherein the third key is the first key used in the first process and the fourth key is the second key used in the first process.

10. The apparatus or system according to claim 1, wherein the transmission of the challenge and the response between the locker system and the mobile device is at least partially based on a first wireless transmission technique, and the transmission of the challenge and the response between the backend system and the mobile device is at least partially based on a second wireless transmission technique that is different from the first wireless transmission technique.

11. The apparatus or system according to claim 10, wherein information pertaining to the locker system is broadcast by the locker system, and wherein the mobile device receives the information and uses the information to set up communication with the locker system according to the first wireless transmission technique.

12. The apparatus or system according to claim 1, wherein successful authentication of a user of the mobile device vis-à-vis the backend system is a necessary condition for reception of the response from the backend system.

13. The apparatus or system according to claim 12, wherein the at least one memory and the computer program code are configured to, with the at least one processor, cause the apparatus or system to perform and/or control the method at least twice, first as a first process and then again as a second process, wherein in the first process, the second key is unique for the locker system and the mobile device is a mobile device of a first person; and wherein in the second process, the second key is unique for the compartment or associated with a single use of the compartment only, and the mobile device is a mobile device of a second person;
wherein in both the first process and the second process, access to the same compartment is granted; wherein in the second process, the user of the mobile device is the second person, and wherein the authentication of the second person is based on at least a first information associated with the compartment and/or with an object stored in the compartment and a second information.

14. The apparatus or system according to claim 13, wherein the first information or information associated with the first information and the second information are provided to the mobile device of the second person and/or to the second person via the same provision channel, and wherein the provision channel is making a notification card bearing the first information or the information associated with the first information and the second information on it physically available to the second person.

15. The apparatus or system according to claim 1, wherein access is jointly granted to a plurality of compartments based on a single challenge and a single response.

16. The apparatus or system according to claim 1, wherein the second key is unique for the locker system.

17. The apparatus or system according to claim 1, wherein the second key is unique for the compartment of the locker system.

18. The apparatus or system according to claim 1, wherein the challenge comprises an identifier of the compartment to which access is desired.

19. An apparatus or system, the apparatus or system comprising at least one processor and at least one memory including computer program code, the at least one memory and the computer program code configured to, with the at least one processor, cause an apparatus or system at least to perform and/or control a method comprising:
receiving, at a mobile device, a challenge transmitted by a locker system;
transmitting the challenge received at the mobile device to a backend system;
receiving, at the mobile device, a response from the backend system, wherein the response has been generated by the backend system at least based on the challenge received from the mobile device and on a first key stored at the backend system;
transmitting the response received at the mobile device from the mobile device to the locker system, wherein the locker system is configured to grant access to a compartment of the locker system at least depending on a result of a checking whether the response received at the locker system has been generated under usage of at least the challenge and a key that corresponds to a second key stored at the locker system.

20. An apparatus or system, the apparatus or system comprising at least one processor and at least one memory including computer program code, the at least one memory and the computer program code configured to, with the at least one processor, cause an apparatus or system at least to perform and/or control a method comprising:
receiving, at a backend system, a challenge transmitted by a mobile device;
generating, at the backend system, at least based on the challenge received from the mobile device and on a first key stored at the backend system, a response;
transmitting the response from the backend system to the mobile device, wherein the mobile device is configured to transmit the response to a locker system, wherein the challenge received from the mobile device has been received by the mobile device from the locker system, and wherein the locker system is configured to grant access to a compartment of the locker system at least depending on a result of a checking whether a response transmitted to the locker system has been generated under usage of at least the challenge and a key that corresponds to a second key stored at the locker system.

21. The apparatus or system according to claim 19, wherein the method that the apparatus or system is caused at least to perform and/or control further comprises:
receiving, at the mobile device and from the backend system, an identifier for the compartment, wherein the compartment has been determined by the backend system from a plurality of compartments of the locker system, and
transmitting from the mobile device to the locker system and prior to receiving, at the mobile device, the challenge transmitted by the locker system, a request for access to the compartment, wherein the request contains the identifier of the compartment.

22. The apparatus or system according to claim 20, wherein the method that the apparatus or system is caused at least to perform and/or control further comprises, prior to receiving, at the backend system, the challenge transmitted by the mobile device:
determining, at the backend system, the compartment from a plurality of compartments, and
transmitting, from the backend system to the mobile device, an identifier of the compartment, wherein the mobile device is configured to transmit a request for access to the compartment to the locker system, the request containing the identifier of the compartment, to receive the challenge transmitted by the locker system in response to the request and to transmit the challenge to the backend system.

23. The apparatus or system according to claim 21, wherein the compartment has been determined at least based on respective status information of at least the compartment maintained at the backend system and/or based on information provided by the mobile device to the backend and associated with an object stored in the compartment.

24. The apparatus or system according to claim 19, wherein the transmission of the challenge and the response between the locker system and the mobile device is at least partially based on a first wireless transmission technique, and the transmission of the challenge and the response between the backend system and the mobile device is at least partially based on a second wireless transmission technique that is different from the first wireless transmission technique.

25. The apparatus or system according to claim 24, wherein information pertaining to the locker system is broadcast by the locker system, and wherein the mobile device receives the information and uses the information to set up communication with the locker system according to the first wireless transmission technique.

26. The apparatus or system according to claim 19, wherein successful authentication of a user of the mobile device vis-à-vis the backend system is a necessary condition for reception of the response from the backend system.

27. The apparatus or system according to claim 19, wherein access is jointly granted to a plurality of compartments based on a single challenge and a single response.

28. The apparatus or system according to claim 22, wherein the compartment has been determined at least based on respective status information of at least the compartment maintained at the backend system and/or based on information provided by the mobile device to the backend and associated with an object stored in the compartment.

29. The apparatus or system according to claim 20, wherein the second key is associated with a single use of the compartment only, generated or selected by the backend system and transmitted towards the locker system for storage in the locker system.

30. The apparatus or system according to claim 20, wherein the transmission of the challenge and the response between the locker system and the mobile device is at least partially based on a first wireless transmission technique, and the transmission of the challenge and the response between the backend system and the mobile device is at least partially based on a second wireless transmission technique that is different from the first wireless transmission technique.

31. The apparatus or system according to claim 20, wherein successful authentication of a user of the mobile device vis-à-vis the backend system is a necessary condition for reception of the response from the backend system.

32. A method comprising:
transmitting a challenge from a locker system to a mobile device;
receiving a response from the mobile device at the locker system, wherein the response has been generated by a backend system, which received the challenge from the mobile device, at least based on the challenge received by the backend system and on a first key stored at the backend system and has been transmitted to the mobile device;
checking at the locker system whether the received response has been generated under usage of at least the challenge and a key that corresponds to a second key stored at the locker system; and
granting access to a compartment of the locker system at least depending on a result of the checking.

33. The method according to claim 32, wherein the method further comprises:
receiving, prior to the transmitting of the challenge from the locker system to the mobile device, a request for access to the compartment at the locker system and from the mobile device, wherein the request contains an identifier of the compartment, wherein the compartment has been determined by the backend from a plurality of compartments of the locker system, and wherein the identifier of the compartment has been transmitted from the backend system to the mobile device.

34. A method comprising:
receiving, at a mobile device, a challenge transmitted by a locker system;
transmitting the challenge received at the mobile device to a backend system;
receiving, at the mobile device, a response from the backend system, wherein the response has been generated by the backend system at least based on the challenge received from the mobile device and on a first key stored at the backend system;
transmitting the response received at the mobile device from the mobile device to the locker system, wherein the locker system is configured to grant access to a compartment of the locker system at least depending on a result of a checking whether the response received at the locker system has been generated under usage of at least the challenge and a key that corresponds to a second key stored at the locker system.

35. The method according to claim 34, wherein the method further comprises:
receiving, at the mobile device and from the backend system, an identifier for the compartment, wherein the compartment has been determined by the backend system from a plurality of compartments of the locker system, and
transmitting from the mobile device to the locker system and prior to receiving, at the mobile device, the challenge transmitted by the locker system, a request for access to the compartment, wherein the request contains the identifier of the compartment.

36. A method comprising:
receiving, at a backend system, a challenge transmitted by a mobile device;
generating, at the backend system, at least based on the challenge received from the mobile device and on a first key stored at the backend system, a response;
transmitting the response from the backend system to the mobile device, wherein the mobile device is configured to transmit the response to a locker system, wherein the challenge received from the mobile device has been received by the mobile device from the locker system, and wherein the locker system is configured to grant access to a compartment of the locker system at least depending on a result of a checking whether a response transmitted to the locker system has been generated under usage of at least the challenge and a key that corresponds to a second key stored at the locker system.

37. The method according to claim 36, wherein the method further comprises, prior to receiving, at the backend system, the challenge transmitted by the mobile device:
determining, at the backend system, the compartment from a plurality of compartments, and
transmitting, from the backend system to the mobile device, an identifier of the compartment, wherein the mobile device is configured to transmit a request for access to the compartment to the locker system, the request containing the identifier of the compartment, to receive the challenge transmitted by the locker system in response to the request and to transmit the challenge to the backend system.

\* \* \* \* \*